US 11,975,718 B2

(12) United States Patent
Ha et al.

(10) Patent No.: US 11,975,718 B2
(45) Date of Patent: May 7, 2024

(54) METHOD AND APPARATUS FOR CONTROLLING A DRIVING GUIDELINE OF VEHICLE MOVING OBJECT

(71) Applicants: Hyundai Motor Company, Seoul (KR); Kia Motors Corporation, Seoul (KR); AJOU UNIVERSITY INDUSTRY-ACADEMIC COOPERATION FOUNDATION, Suwon-si (KR)

(72) Inventors: Jae Jun Ha, Hwaseong-Si (KR); Ilsoo Yun, Yongin-Si (KR); Sangmin Park, Yesan-Gun (KR); Sungho Park, Yongin-Si (KR); Harim Jeong, Suwon-Si (KR); Cheolwoo Kwon, Suwon-Si (KR); Jiwon Kim, Suwon-Si (KR); Kiyeon Park, Suwon-Si (KR)

(73) Assignees: Hyundai Motor Company, Seoul (KR); Kia Motors Corporation, Seoul (KR); AJOU UNIVERSITY INDUSTRY-ACADEMIC COOPERATION FOUNDATION, Suwon-si (KR)

( * ) Notice: Subject to any disclaimer, the term of this patent is extended or adjusted under 35 U.S.C. 154(b) by 368 days.

(21) Appl. No.: 17/159,089

(22) Filed: Jan. 26, 2021

(65) Prior Publication Data
US 2021/0237735 A1 Aug. 5, 2021

(30) Foreign Application Priority Data
Jan. 30, 2020 (KR) .................. 10-2020-0011139

(51) Int. Cl.
*B60W 30/18* (2012.01)
*B60W 30/095* (2012.01)
*B60W 50/14* (2020.01)

(52) U.S. Cl.
CPC .. *B60W 30/18159* (2020.02); *B60W 30/0956* (2013.01); *B60W 30/18145* (2013.01);
(Continued)

(58) Field of Classification Search
CPC ....... B60W 30/18159; B60W 30/0956; B60W 30/18145; B60W 50/14; B60W 2554/404;
(Continued)

(56) References Cited

U.S. PATENT DOCUMENTS 9,043,132 B2 * 5/2015 Obi ..................... G01S 13/931
701/400
9,701,306 B2 * 7/2017 Prokhorov ............ B60W 30/09
(Continued)

OTHER PUBLICATIONS

Excerpt from Wikipedia entitled "MERGE (Traffic)", dated Dec. 13, 2021.

*Primary Examiner* — Jelani A Smith
*Assistant Examiner* — Alyssa Rorie
(74) *Attorney, Agent, or Firm* — MORGAN, LEWIS & BOCKIUS LLP

(57) ABSTRACT

A method for providing a driving guideline in a moving object may include: triggering a driving guideline provision instruction in the moving object; based on the implemented triggering, generating, by the moving object, a driving guideline; outputting the generated driving guideline; and driving, by the moving object, based on the driving guideline.

17 Claims, 27 Drawing Sheets

(52) U.S. Cl.
CPC ....... *B60W 50/14* (2013.01); *B60W 2050/143* (2013.01); *B60W 2050/146* (2013.01); *B60W 2554/404* (2020.02)

(58) Field of Classification Search
CPC ..... B60W 2050/143; B60W 2050/146; B60W 30/0953; B60W 2420/42; B60W 2552/53; B60W 2554/4023; B60W 2556/40; B60W 2556/45; B60W 2556/65; B60W 2540/20; B60W 2554/402; B60W 2556/50; B60W 60/001; B60W 2050/0005; B60W 30/08; B60W 30/14; B60W 30/18154; B60W 40/02; B60W 40/105; B60W 2050/0026; B60W 2050/0064; B60W 2050/009; B60W 2520/10; B60W 2552/05; B60W 2555/60; B60W 2556/60; B60W 2420/403; B60K 2370/178; B60K 2370/179; B60K 2370/166; B60K 35/00; B60K 2370/1529; B60K 2370/177; B60K 2370/175; B60K 2360/179; B60K 35/23; B60K 2360/166; B60K 2360/177; B60K 2360/178; B60K 35/28; B60K 2360/175; G08G 1/161; G08G 1/166; G08G 1/096725; G01C 21/26

See application file for complete search history.

(56) References Cited

U.S. PATENT DOCUMENTS

| | | | |
|---|---|---|---|
| 10,186,150 B2 * | 1/2019 | Aoki | G08G 1/166 |
| 10,607,490 B2 * | 3/2020 | Ikedo | B60Q 9/008 |
| 2016/0335892 A1 * | 11/2016 | Okada | G08G 1/123 |
| 2017/0039856 A1 * | 2/2017 | Park | G01C 21/34 |
| 2018/0257645 A1 | 9/2018 | Aktiengesellschaft | |
| 2018/0328752 A1 | 11/2018 | Tomatsu et al. | |
| 2019/0077402 A1 * | 3/2019 | Kim | B60W 30/12 |
| 2019/0078897 A1 * | 3/2019 | Sumizawa | B60W 30/18154 |
| 2019/0221125 A1 | 7/2019 | Kaisha | |
| 2019/0225219 A1 | 7/2019 | Ueda et al. | |
| 2019/0367021 A1 | 12/2019 | Nissan | |
| 2019/0369634 A1 | 12/2019 | Tatourian et al. | |
| 2021/0197807 A1 * | 7/2021 | Park | B60W 30/09 |
| 2021/0304608 A1 * | 9/2021 | Clark | B60W 50/14 |
| 2022/0101611 A1 * | 3/2022 | Lee | G02B 27/0093 |
| 2022/0234615 A1 * | 7/2022 | Nishino | B60W 60/0011 |

* cited by examiner

FIG. 6
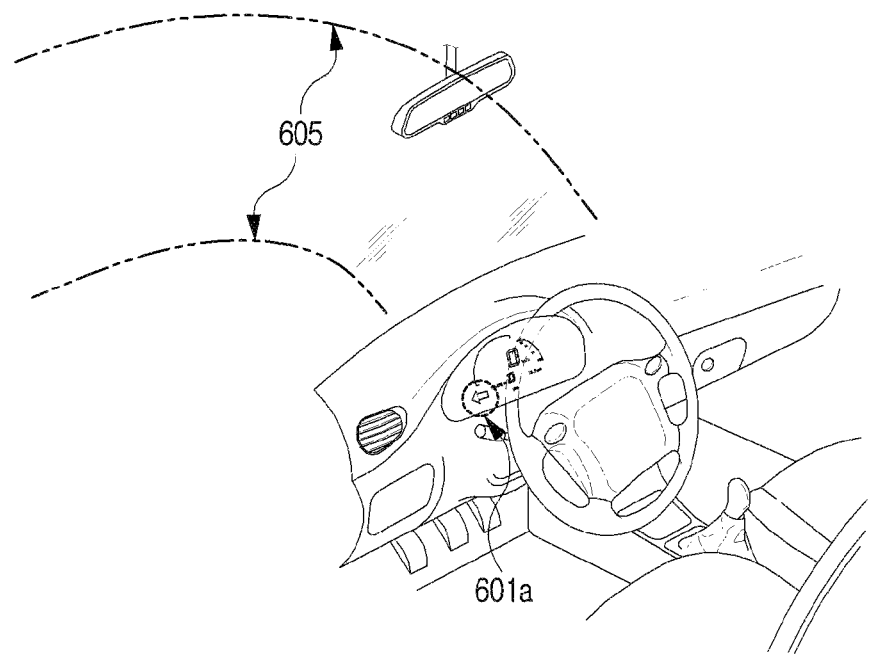
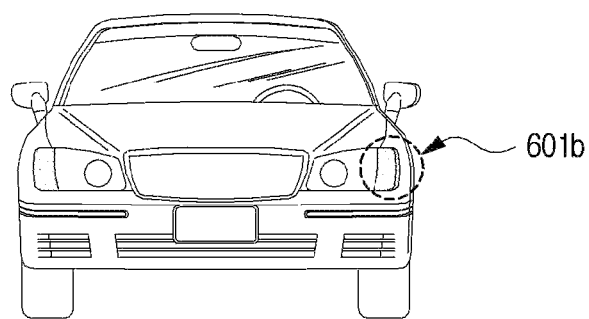

METHOD AND APPARATUS FOR CONTROLLING A DRIVING GUIDELINE OF VEHICLE MOVING OBJECT

The present application claims priority to Korean Patent Application No. 10-2020-0011139, filed Jan. 30, 2020, the entire contents of which is incorporated herein for all purposes by this reference.

BACKGROUND OF THE INVENTION

Field of the Invention

The prevent invention relates to a method and apparatus capable of controlling a driving guideline in a moving object.

Description of Related Art

Along with technical advances, a vehicle can communicate with other devices on the basis of various types of communication methods. Furthermore, not only vehicles but also various apparatuses are being used as mobile devices, and communication methods using such apparatuses are evolving.

An autonomous vehicle is a human-friendly vehicle that can automatically recognize, judge and control a driving condition by utilizing information collected through mounted sensors and a V2X communication apparatus without the driver's intervention. According to the standard provided by the Society of Automotive Engineers (SAE), autonomous cars are defined by a total of 6 levels, among which Level 3 (conditionally autonomous), Level 4 (highly autonomous) and Level 5 (fully autonomous) correspond to autonomous driving in a real sense. Furthermore, based on autonomous vehicles, various convenience functions may be provided to vehicle drivers. Hereinafter, an operation based on an autonomous vehicle will be described as a convenience function provided to a driver of the vehicle.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

The present invention relates to a method and apparatus of providing a driving guideline.

The present invention relates to a method and apparatus of providing a turn guideline.

The present invention relates to a method and apparatus of determining a collision possibility of a moving object based on a driving guideline.

According to various aspects of the present invention, a method of providing a guideline may be provided. The method of providing a guideline in a moving object may include: triggering a driving guideline provision instruction in the moving object; generating, by the moving object, the driving guideline based on the executed triggering; outputting the generated driving guideline; and driving, by the moving object, based on the driving guideline.

According to various aspects of the present invention, a moving object providing a guideline may be provided. The moving object providing a guideline may include a transceiver configured for transmitting and receiving a signal and a processor configured for controlling the transceiver. Herein, the processor may trigger a driving guideline provision instruction, generate the driving guideline based on the triggering, output the generated driving guideline and drive the moving object based on the driving guideline.

According to various aspects of the present invention, a method of controlling a movement of a moving object based on a guideline may be provided. The method of controlling a movement of a moving object may include: determining access of the moving object to an intersection; determining an operation mode of the moving object for the intersection; and controlling a movement of the moving object based on based on the determined operation mode and a driving guideline on the intersection.

According to various aspects of the present invention, a moving object for controlling a movement based on a guideline may be provided. The moving object may include a transceiver configured for transmitting and receiving a signal and a processor configured for controlling the transceiver. Herein, the processor may execute operations of determining whether or not the moving object enters an intersection, determining an operation mode of the intersection, and controlling a movement of the moving object based on the determined operation mode.

The features briefly summarized above with respect to the present invention are merely exemplary aspects of the detailed description below of the present invention, and do not limit the scope of the present invention.

According to various exemplary embodiments of the present invention, a method and apparatus of providing a guideline may be provided.

According to various exemplary embodiments of the present invention, a method and apparatus of providing a driving guideline may be provided.

According to various exemplary embodiments of the present invention, a method and apparatus of determining a collision possibility of a moving object based on a guideline may be provided.

The technical objects of the present invention are not limited to the above-mentioned technical objects, and other technical objects that are not mentioned will be clearly understood by those skilled in the art through the following descriptions.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 6 is a view exemplarily illustrating a method of triggering a driving guideline according to various exemplary embodiments of the present invention.

Figure 1:
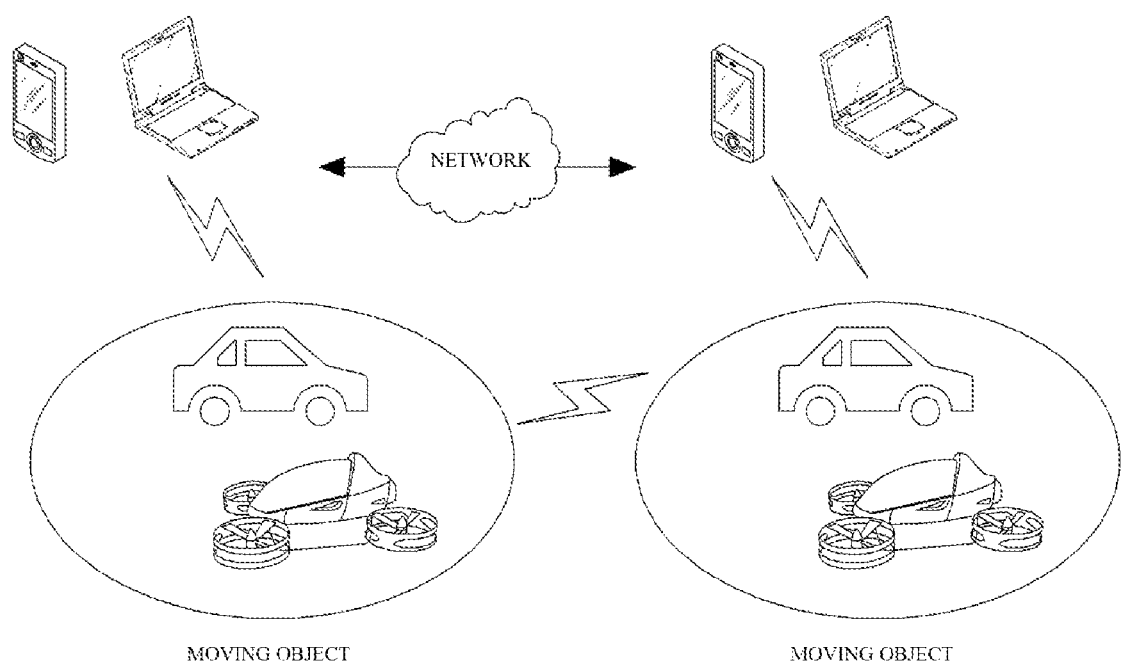
FIG. 1 is a view exemplarily illustrating a method by which a moving object communicates with another moving object or a device through a network, according to various exemplary embodiments of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, embodiments of the present invention will be described in detail with reference to the accompanying drawings, which will be easily implemented by those skilled in the art. However, the present invention may be embodied in many different forms and is not limited to the embodiments described herein.

In the following description of the exemplary embodiments of the present invention, a detailed description of known functions and configurations incorporated herein will be omitted when it may make the subject matter of the present invention rather unclear. Parts not related to the description of the present invention in the drawings are omitted, and like parts are denoted by similar reference numerals.

In various exemplary embodiments of the present invention, when a component is referred to as being "connected", "coupled", or "connected" to another component, it is understood that not only a direct connection relationship but also an indirect connection relationship through an intermediate component may also be included. Furthermore, when a component is referred to as "comprising" or "having" another component, it may mean further inclusion of another component not the exclusion thereof, unless explicitly described to the contrary.

In various exemplary embodiments of the present invention, the terms first, second, etc. are used only for distinguishing one component from another, and do not limit the order or importance of components, etc., unless specifically stated otherwise. Thus, within the scope of the present disclosure, a first component in various exemplary embodiments of the present invention may be referred to as a second component in another exemplary embodiment of the present invention, and similarly a second component in various exemplary embodiments of the present invention may be referred to as a first component.

In various exemplary embodiments of the present invention, components that are distinguished from each other are intended to clearly illustrate each feature. However, it does not necessarily mean that the components are separate. That is, a plurality of components may be integrated into one hardware or software unit, or a single component may be distributed into a plurality of hardware or software units. Thus, unless otherwise noted, such integrated or distributed embodiments are also included within the scope of the present invention.

In various exemplary embodiments of the present invention, components described in the various embodiments are not necessarily essential components, and some may be optional components. Accordingly, embodiments including a subset of the components described in an exemplary embodiment are also included within the scope of the present invention. Also, embodiments that include other elements in addition to the elements described in the various embodiments are also included in the scope of the present invention.

Methods of accomplishing the advantages and features of the present invention will be apparent in reference to the exemplary embodiments that are described below in detail However, the present invention is not limited to the exemplary embodiments set forth herein but may be embodied in various forms. The exemplary embodiments are provided to make included contents of the present invention thorough and complete and to completely convey the scope of the present invention to those with ordinary skill in the art.

FIG. 1 is a view exemplarily illustrating a method where a moving object communicates with another moving object or device through a network. Referring to FIG. 1, a moving object may communicate with another moving object or another device. Herein, for example, a moving object may communicate with another moving object or another device based on cellular communication, WAVE communication, DSRC (Dedicated Short Range Communication) and other communication systems. In other words, a cellular network like LTE and 5G, a WiFi network and a WAVE network may be used. Furthermore, a short-range network like DSRC for moving objects may be used. The above-described embodiments are not exhaustive.

Furthermore, for example, with regard to communication of a moving object, for the security of a moving object, a communication module dedicated for devices inside the moving object may be separated from a module for communicating with a device outside the moving object. For example, only devices within a certain range inside a moving object may perform communication such as WiFi communication based on security. For example, a communication module may be included for communication between a moving object and the driver's person device. In other words, a moving object and the driver's personal device may use a communication network blocked from an external communication network. Furthermore, for example, a moving object may include a communication module performing communication with an external device. Furthermore, for example, the above-described module may be implemented as a single module. In other words, based on a single module, a moving object may communicate with anther device, which is not limited to the above-described embodiment. In other words, communication in a moving object may be embodied in various methods and is not limited to the above-described embodiment.

Herein, for example, a moving object may refer to a device. For example, a moving object may be a vehicle (including an autonomous vehicle or an automated vehicle), a drone, a mobility, a mobile office, a mobile hotel, a PAV (Personal Air Vehicle), UAM (Urban Air Mobility), or eVTOL (Electric Vertical Take-Off and Landing). Furthermore, a moving object may be any other mobile device and is not limited to the above-described embodiments.

Figure 2:
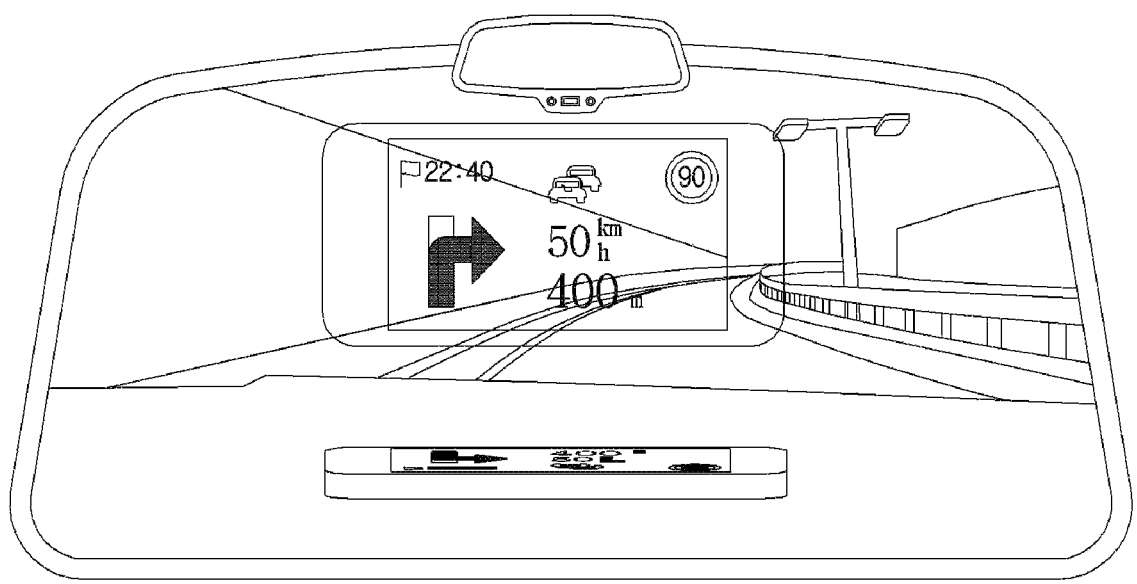
FIG. 2 is a view exemplarily illustrating an augmented reality navigation system in a moving object according to various exemplary embodiments of the present invention.

FIG. 2 is a view exemplarily illustrating an augmented reality navigation system in a moving object according to various exemplary embodiments of the present invention. Referring to FIG. 2, an augmented reality navigation system may be realized on a front windshield of a moving object or in a driving view of the moving object. As an example, the augmented reality navigation system may be realized based on a head up display (HUD) which is provided for driving assistance in a moving object or complete autonomous driving. As an example, the above-described augmented reality navigation system may be utilized to display a lane where a moving object is running or to generate visual information which is used to help steering of a moving object as an autonomous vehicle. In various exemplary embodiments of the present invention, in FIG. 2, the current speed or navigation information related to a moving object may be provided to a user who utilizes a moving object based on an augmented reality navigation system. That is, an augmented reality navigation system of a moving object may help the driving of the moving object by providing visual information. Herein, as an example, the visual information may be set by a user so that it does not interfere with the driving of the moving object. Also, as an example, it may be used to help safe and comfortable driving. Herein, HUD may prevent an accident that occurs when the user of the moving object does not gaze forward but sees another display or operates a button. In this regard, HUD may be realized in a front region.

Furthermore, in various exemplary embodiments of the present invention, an augmented reality navigation system may be realized based on a method for reflecting and displaying information based on a front windshield. Furthermore, as an example, an augmented reality navigation system may be realized as a hologram and is not limited to the above-described embodiment. That is, an augmented reality navigation system may be realized and provided to a user in a moving object and is not limited to the above-described embodiment.

In various exemplary embodiments of the present invention, a turn of a moving object refers to a movement that the moving object has around a reference point. For example, the turn of the moving object may include a left turn of the moving object, a right turn of the moving object, a U-turn of the moving object, and a turn in a 360 roundabout. Hereinafter, the exemplary embodiments of the present invention illustrate the turn of the moving object making a left turn by considering a traffic signal system based on right-side traffic. Although the exemplary embodiments of the present invention illustrate the turn of the moving object by focusing on a left turn of the moving object, the present invention is not limited thereto and may be applied to other various operations like a right turn of the moving object, a U-turn of the moving object and a turn in a 360 roundabout.

Moreover, the left-turn signal may be separately operated from the green light in a right-side traffic environment, while the right-turn signal may be separately operated from the green light in a left-side traffic environment. With this being considered, in a method of generating a guideline based on a left turn illustrated in the exemplary embodiments of the present invention, when factors or parameters related in a direction of turn are changed to a right turn, a guideline for right turn of a moving object may be generated.

Figure 3:
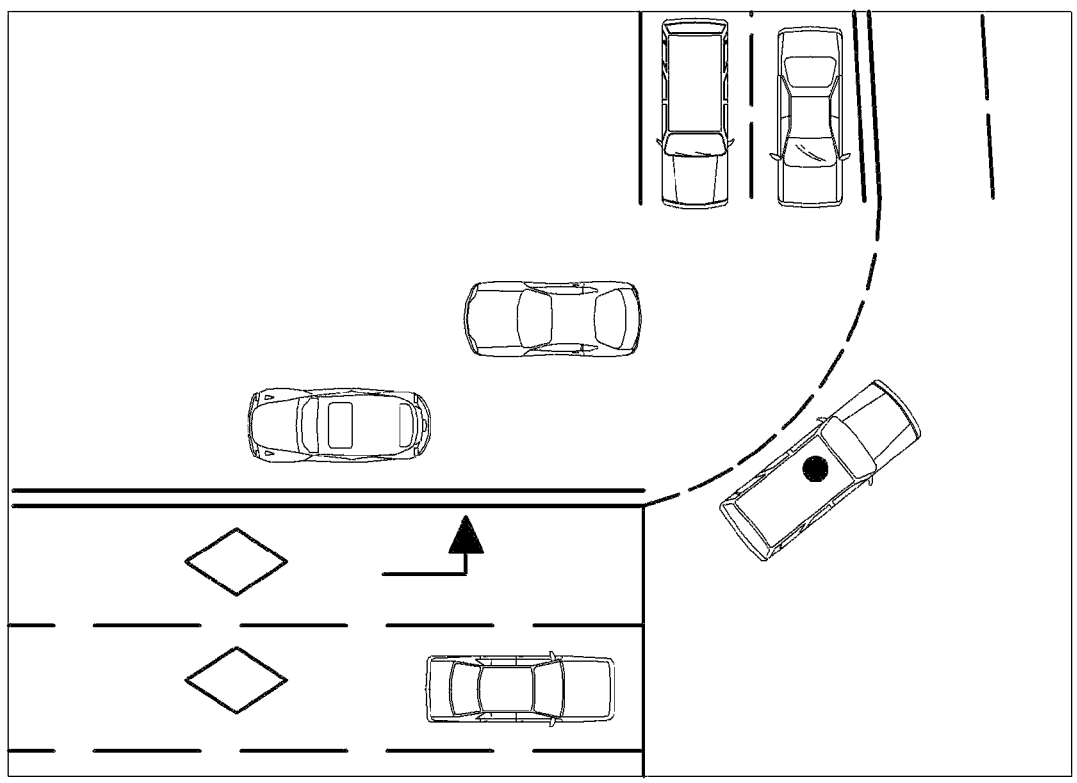
FIG. 3 is a view exemplarily illustrating a method of providing a guideline to a moving object according to various exemplary embodiments of the present invention.

FIG. 3 is a view exemplarily illustrating a method of providing a guideline to a moving object according to various exemplary embodiments of the present invention. Referring to FIG. 3, a guideline for driving a moving object may be provided. In various exemplary embodiments of the present invention, a moving object as an autonomous vehicle may perform driving by recognizing a guiding line marked on a road. Thus, even when a user of the moving object does not control the moving object, the moving object may operate by recognizing a driving route. However, as an example, when a guiding line is interrupted as in an intersection, a moving object may not be able to recognize the guiding line and thus problems for the autonomous driving of the moving object may be occurred. With the above description being considered, when a moving object as an autonomous vehicle has to pass an intersection, no conventional method is secured to enable the moving object as the autonomous vehicle to identify a signal manifestation and to make a safe left-turn, causing a problem in autonomous driving. Furthermore, as an example, even when a moving object does not run based on autonomous driving, a normal driver may fail to accurately identify a left-turn lane and thus an accident may occur.

In various exemplary embodiments of the present invention, an autonomous vehicle may use a camera sensor to identify a signal manifestation. Herein, the moving object as the autonomous vehicle may recognize signal equalization through a camera sensor and utilize signal manifestation information through a V2X communication. Herein, as an example, a guiding line for a left-turn lane may be provided in the intersection by considering the driving of the autonomous vehicle. However, when the guiding line is provided on every left-turn lane, normal drivers may be confused and a lot of money and efforts may be needed to maintain the guiding line. With this being considered, a technology may be required to make an autonomous vehicle making a left turn on a left-turn lane accurately recognize a lane on the opposite side (that is, the left-side road), to which it has to enter, and a driving route. As an example, the Internet of Things (IoT) technology may be utilized for what is described. A system may be required which is capable of guiding an autonomous vehicle to a lane on the opposite side (that is, the left-side road), to which the autonomous vehicle is advancing, and a driving route based on IoT devices. Hereinafter, with consideration for what is described above, will be described a method of configuring a guideline on a road, in which an autonomous vehicle or a moving object cannot recognize a left-turn guiding line, a visible guiding line or a magnetic sensing-related line, and of operating the moving object based on the configured guideline.

Figure 4:
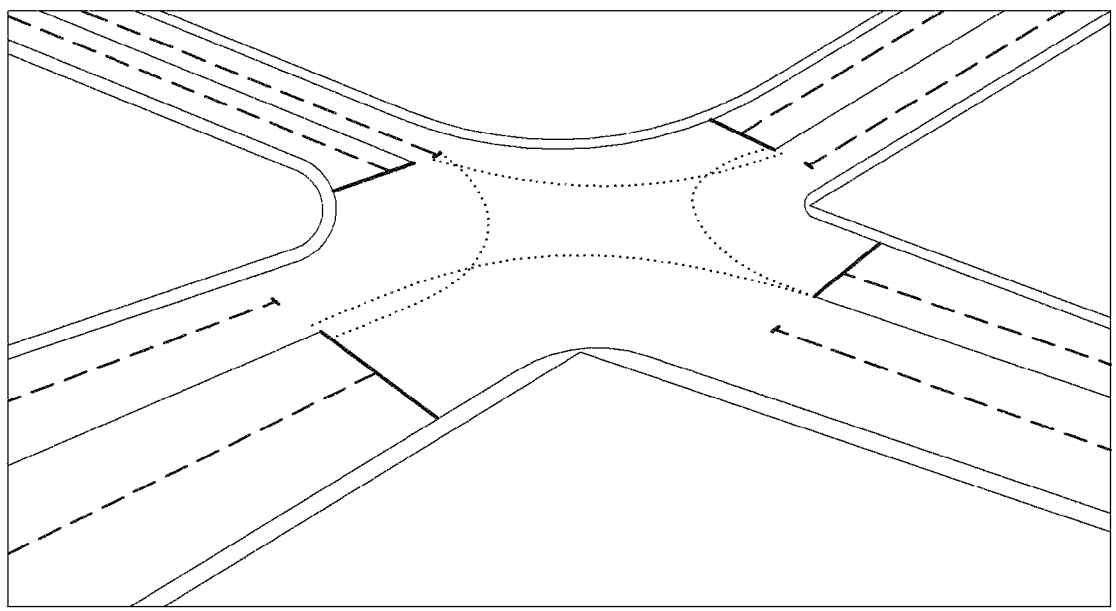
FIG. 4 is a view exemplarily illustrating a method of constructing a guideline with consideration for driving of a moving object according to various exemplary embodiments of the present invention.

FIG. 4 is a view exemplarily illustrating a method of constructing a guideline with consideration for driving of a moving object according to various exemplary embodiments of the present invention.

Referring to FIG. 4, a moving object may drive along a guideline. A moving object may drive based on a left-turn guideline at an intersection where no line exists on the road. Herein, as an example, the left-turn guideline may be provided through the above-described augmented reality navigation system or a local dynamic map (LDM). That is, a guideline may not be a line which is the guiding line actually marked on road but may be a virtual line recognizable by a user in a moving object. As described above, to provide a virtual line to a user, a moving object needs to check the position information related to the moving object and information on the surroundings. As an example, a moving object may be provided with a Global Positioning System (GPS) and an inertial navigation system for what is described above. As an example, a moving object may identify the position information related to the moving object by use of the above-described apparatuses. Furthermore, a moving object may check whether it currently stops or is running through the above-described apparatuses and thus may specify information on a left-turn lane. Furthermore, as an example, a moving object may communicate with neighbor apparatuses and provide a guideline based on information which is obtained from the neighbor apparatuses. When the above-described operation is considered, a moving object may communicate with an IoT-based lane recognition apparatus. Herein, as an example, the IoT-based lane recognition apparatus may be an apparatus capable of a buried IoT sensor communication. Herein, the IoT-based lane recognition apparatus may transmit information related to a current left-turn lane to a moving object through IoT communication along with a Global Positioning System (GPS) and an inertial navigation system in the moving object. A moving object may enhance the accuracy of left-turn lane recognition by use of information received from an IoT-based lane apparatus and information measured by the moving object itself. As an example, for the IoT-based lane recognition apparatus, an IoT sensor communication network may be constructed. A moving object may communicate with an IoT-based lane recognition apparatus via an IoT sensor communication network. Furthermore, as an example, a moving object may perform a communication with road side equipment (RSE) or a neighbor moving object not via an IoT sensor communication network but via a V2X communication network and may recognize a left-turn lane based on this. That is, a moving object may obtain information on a left-turn guideline by performing a communication with at least one of a neighbor moving object and neighbor apparatuses based on various communication methods. A moving object may recognize a left-turn lane or a left-turn guideline by use of information obtained as described above but is not limited to the above-described embodiment.

Furthermore, as an example, as described above, a moving object may accurately recognize a left-turn lane through information which is received from an apparatus included therein or neighbor apparatuses. A moving object may provide a left-turn guideline based on recognized information. A moving object may display a guideline on a high definition map. As an example, when no left-turn guideline is not displayed on a high definition map, a moving object may provide a virtual left-turn guideline so that the moving object can drive. Herein, as an example, the virtual left-turn guideline may be provided by considering a size or position of the moving object, which will be described below.

As a more specific example, it is possible to consider a case in which a left-turn guideline is already set on an LDM and a case in which a left-turn guideline is not set on an LDM. As an example, when a left-turn guideline is already set on an LDM, a service for the left-turn guideline may be provided. Herein, when a moving object enters a left-turn lane, the moving object may identify its position by use of a GPS or an inertial navigation system and recognize the number of the left-turn lane. Furthermore, after recognizing the number for the left-turn lane from an IoT lane recognition apparatus via an IoT communication network, the moving object may compare the number for the left-turn lane recognized by the IoT lane recognition apparatus with the number for the left-turn lane identified using the GPS. Herein, when the number for the left-turn lane recognized by the IoT lane recognition apparatus and the number for the left-turn lane identified using the Global Positioning System (GPS) is same, the moving object may match its position to the left-turn lane on the high definition map in a local dynamic map (LDM) of the moving object. Furthermore, the moving object may recognize an existing left-turn guideline (in case the left-turn guideline actually exists) or a virtual left-turn guideline (in case no left-turn guideline actually exists) on a high definition map in the LDM of the moving object. Herein, the moving object may be able to drive along the guideline and enter a designated lane of the opposite side thereof.

Meanwhile, when there is no left-turn guideline on an LDM, a moving object may generate a virtual left-turn guideline by use of an algorithm, which obtains a left-turn guideline based on one side of road, a centerline of road and lane positions, and provide the virtual left-turn guideline. Herein, the moving object may add the virtual guideline to a high definition map in the LDM and provide the virtual guideline. A moving object or an autonomous vehicle may enter a left-turn lane by use of the information described above.

As an example, in the above description, a method of operating a moving object was described by considering a case in which a left-turn guideline is set on an LDM and a case in which no left-turn guideline is set on an LDM.

Herein, as an example, when no left-turn guideline is set on an LDM, it is necessary to provide not a same left-turn guideline but a virtual guideline suitable for a situation by considering the driving of a moving object. As an example, each moving object may have a different size. Furthermore, even when a moving object or an autonomous vehicle is running on a road, the position of the moving object may be a little different. As an example, different left-turn guidelines may be provided between a case in which a moving object drives close to an inside line of road and enters a left-turn lane and a case in which the moving object drives close to an outside line of road and enters the left-turn lane.

With this being considered, a left-turn guideline may be displayed as a virtual line through a moving object according to left-turn situations. As an example, as described above, a left-turn guideline may be provided through LDM. As various exemplary embodiments of the present invention, a left-turn guideline may be provided through an augmented reality navigation system or an HUD. Hereinafter, a method of providing a left-turn guideline will be described based on the present invention described above.

Figure 5:
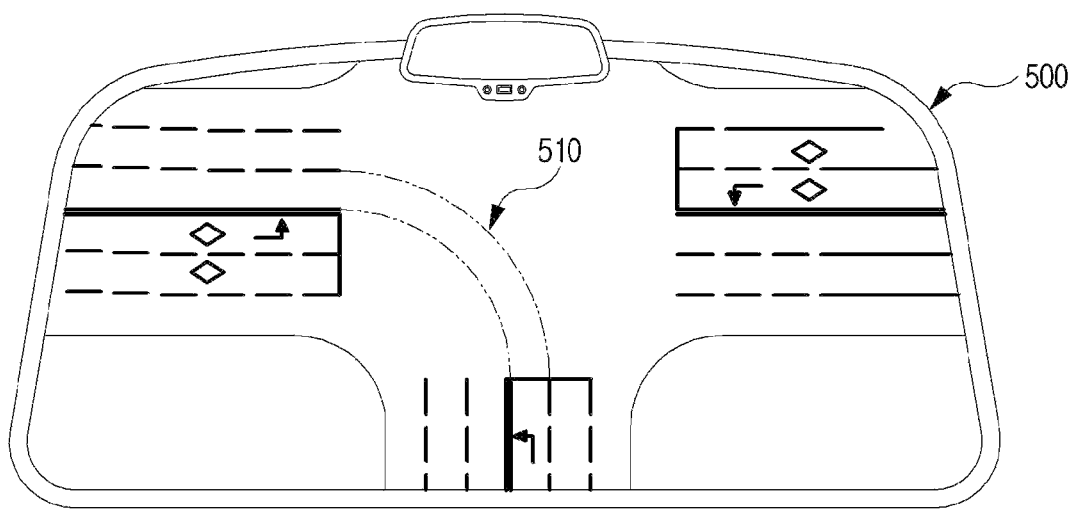
FIG. 5 is a view exemplarily illustrating a method for a moving object to provide a virtual driving guideline according to various exemplary embodiments of the present invention.

FIG. 5 is a view exemplarily illustrating a method for a moving object to provide a virtual driving guideline according to various exemplary embodiments of the present invention.

Referring to FIG. 5, a moving object, as described above, may provide a guideline based on an augmented reality navigation system. Herein, as a moving object drives on a road or a predetermined road, no guideline may be necessary for normal driving. However, when a moving object has a difficulty with identifying a predetermined road while driving at night without lights or on a steep mountain path, the moving object may suggest a travel direction through a guideline. Furthermore, as described above, since the driving of a moving object or an autonomous vehicle may be restricted in a section with no guiding line like an intersection, it may be necessary to provide a virtual guideline. Herein, as an example, the guideline may be provided based on at least one of an augmented reality navigation system, an HUD and an LDM, as described above.

As an example, a moving object may display a guideline 510 for a left turn through an augmented reality navigation system 500. Herein, a user of the moving object may recognize a driving route based on the left-turn guideline 510 displayed through the augmented reality navigation system 500 and be capable of driving without accident. Furthermore, as an example, an autonomous vehicle may also drive by recognizing not a real line or a real guiding line but the guideline 510 in a left-turn situation, preventing an accident.

Meanwhile, as an example, FIG. 6 is a view exemplarily illustrating a method of triggering a left-turn guideline. Referring to FIG. 6, a moving object may activate a left-turn guideline 605 based on left-turn signal lights 601A and 601B. That is, the left-turn guideline 605 may be triggered and provided when the left-turn signal lights 601A and 601B is turned on. As an example, the left-turn guideline 605 may be provided based on at least one of an augmented reality navigation system, an HUD and an LDM. For the convenience of explanation, a method of providing the left-turn guideline 605 is described below based on an augmented reality navigation system. However, the left-turn guideline 605 may also be provided in the same way through an HUD or an LDM.

As an example, an autonomous vehicle may also recognize the guideline 605 which is activated based on the left-turn signal lights 601A and 601B. When an autonomous vehicle drives on a road, the autonomous vehicle may recognize a line or guiding line on the road and perform autonomous driving based on this. Herein, when the left-turn signal lights 601A and 601B are turned on, the autonomous vehicle may perform autonomous driving not along a line or guiding line on the road but along the guideline 605 of an augmented reality system. As an example, when a ling or a guiding line recognized by an autonomous vehicle is overlapping, an error may occur. Accordingly, the autonomous vehicle may display the guideline only with the left-turn signal lights 601A and 601B being turned on and may perform autonomous driving by recognizing the guideline 605.

Figure 7:
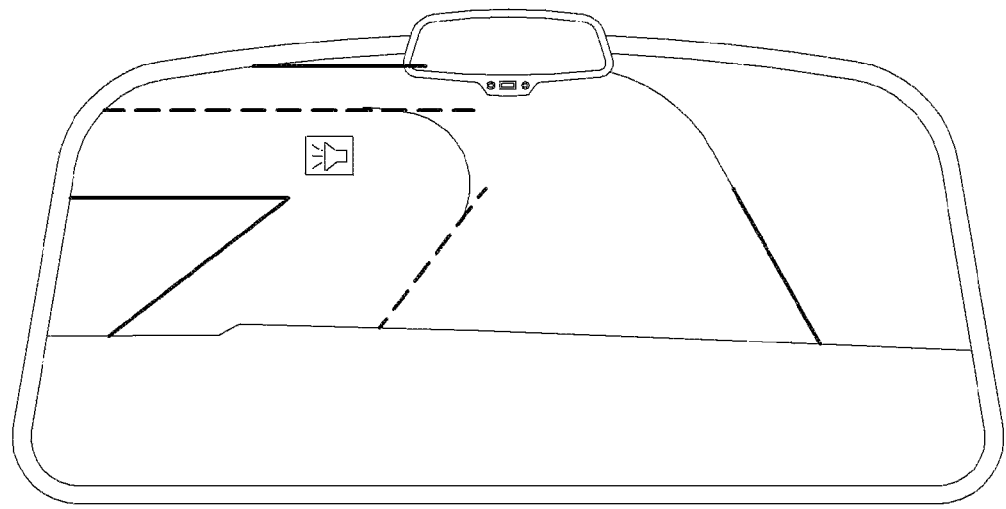
FIG. 7 is a view exemplarily illustrating an operation method of a moving object based on a driving guideline according to various exemplary embodiments of the present invention.

FIG. 7 is a view exemplarily illustrating an operation method of a moving object based on a left-turn guideline.

Referring to FIG. 7, when a moving object make a left turn, the moving object may display a left-turn guideline through an augmented reality navigation system. Herein, as an example, both a moving object and an autonomous vehicle may display a left-turn guideline but is not limited to the above-described embodiment. Herein, the left-turn guideline may be a virtual guideline, as described above. As an example, the left-turn guideline may be set based on at least one of a starting point of left turn, an end point of left turn, road length, the number of lanes, and road information. As various exemplary embodiments of the present invention, the left-turn guideline may be set and displayed by further considering a size or position of a moving object.

As an example, a left-turn guideline may be differently set and display according to the size of a moving object. Furthermore, as an example, a left-turn guideline may be differently set and display according to the position of a moving object. As a more specific example, when a moving object goes over a lane or is located at an edge portion of lane, a left-turn guideline may be differently set.

Herein, a left-turn guideline may be set to a state of being out of a lane. A left-turn guideline may be set and displayed according to each lane. Herein, in virtue of a left-turn guideline which is displayed in accordance with a lane, a moving object may not collide with other moving objects while making a left turn. Furthermore, an autonomous vehicle may also set a left-turn guideline in accordance with a lane and make a left turn without colliding with another moving object. However, as an example, as described above, when a moving object has a large size or its position is not obvious, a left-turn guideline may be set to go over a lane. That is, a moving object may go over to another lane, causing a collision.

In consideration of what is described above, when a left-turn guideline is set and displayed to be go over a lane, a moving object may provide notification information to a neighbor moving object. As an example, a moving object at a standstill may provide a neighbor moving object with information that it may go over a lane while making a left turn. Furthermore, as an example, when making a left turn, a moving object may provide a neighbor moving object with information that it is driving through a guideline going over a lane, preventing a collision.

Furthermore, as described above, when driving along a guideline going over a lane, an autonomous vehicle may exchange information for a left turn with neighbor moving objects before the driving. Thus, the autonomous vehicle may be able to make a left turn without colliding with a neighbor moving object.

Figure 8A:
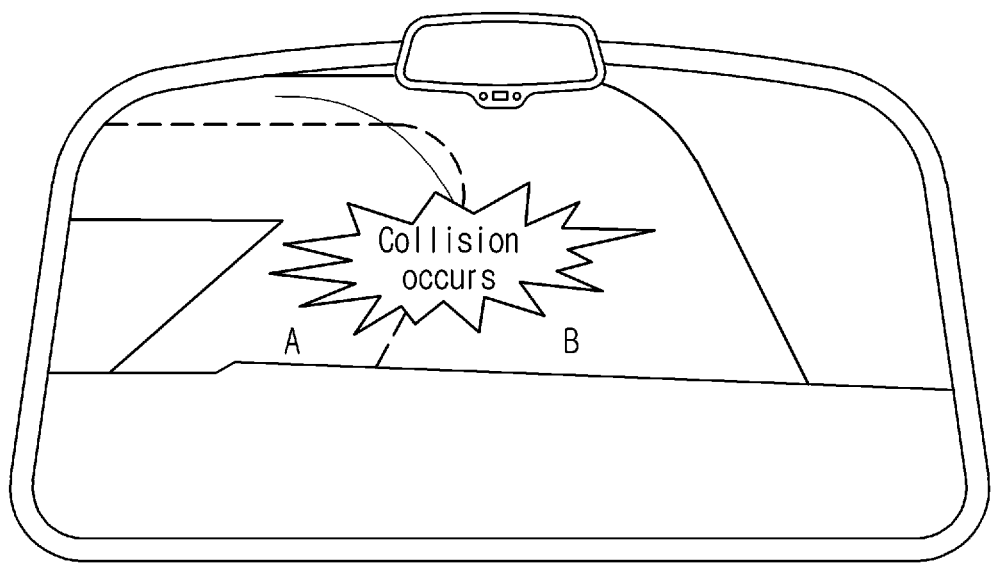
FIG. 8A is a view exemplarily illustrating a case in which a virtual driving guideline goes over a lane, according to various exemplary embodiments of the present invention.

FIG. 8A is a view exemplarily illustrating a case in which a virtual left-turn guideline goes over a lane. Referring to FIG. 8A, both a moving object located on Lane A and a moving object located on Lane B may make a left turn. Herein, a left-turn guideline for the left-turn of a moving object may be provided. However, as described above, a left-turn guideline may be set in various ways according to the size or position of a moving object. As an example, in FIG. 8A, the moving object located on Lane A and the moving object located on Lane B may drive along respective left-turn guidelines. Herein, the left-turn guideline of the moving object located on Lane B may be provided to an area that overlaps with the driving of the moving object located on Lane A. Accordingly, when the moving object located on Lane A and the moving object located on Lane B make a left turn simultaneously based on a left-turn guideline, a collision may occur to each vehicle. As an example, when both the moving object located on Lane A and the moving object located on Lane B are autonomous vehicles, if each moving object drives along with each left-turn guideline, a collision may occur.

Figure 8B:
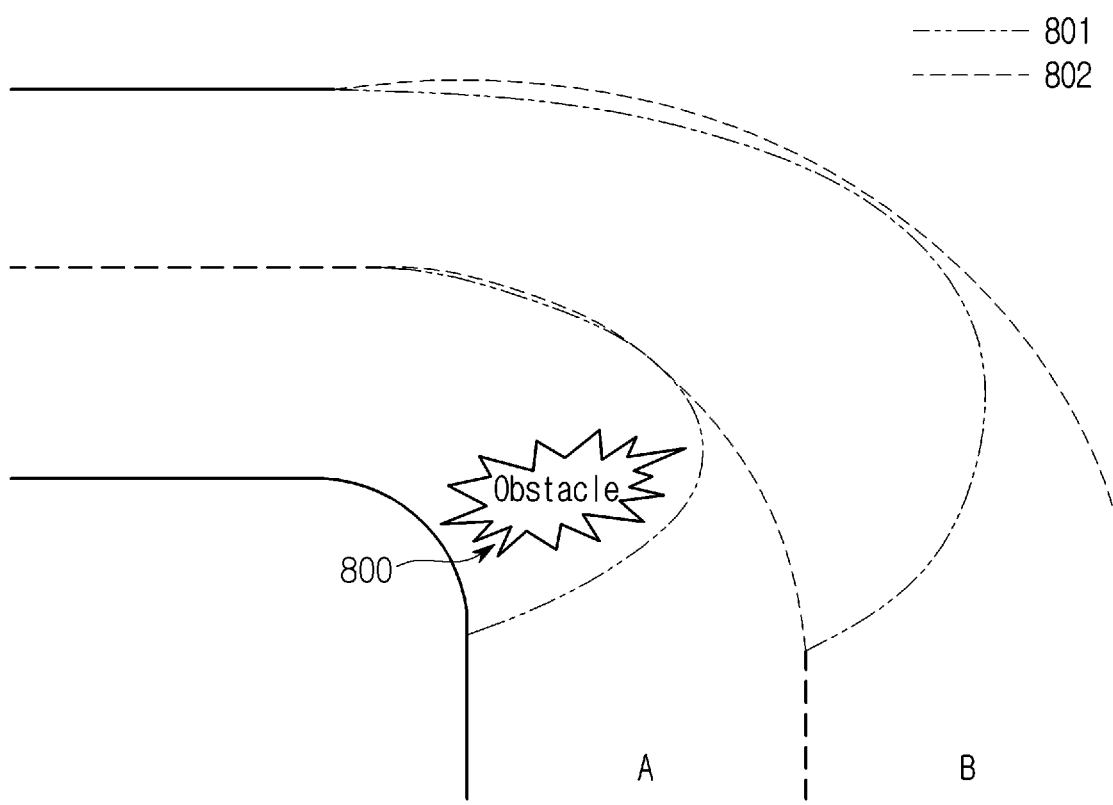
FIG. 8B is a view exemplarily illustrating a virtual driving guideline provided in a case where an obstacle exists on a left-turn lane.

FIG. 8B is a view exemplarily illustrating a virtual left-turn guideline provided in a case where an obstacle exists on a left-turn lane. Referring to FIG. 8B, both a moving object located on Lane A and a moving object located on Lane B may make a left turn. Herein, depending on the circumstances of a road, there may be an obstacle (e.g., a fallen object, a moving object, a pothole, etc.) on a left-turn lane. With this being considered, a moving object may first check whether or not there is an obstacle on a lane and generate and provide a left-turn guideline that avoids the obstacle by considering the presence of the obstacle. When it is assumed that an obstacle 800 exists on the left-turn lane of Lane A, a moving object located on Lane A may check whether or not the obstacle 800 exists through an image analysis and then generate and provide a guideline 801 capable of avoiding the obstacle 800. Furthermore, a moving object located on Lane B may generate and provide a guideline 802 based on Lane B since there is no obstacle in its moving or travel route.

Moreover, since the guideline 801 capable of avoiding the obstacle 800 overlaps with the guideline 802 based on Lane B, when a moving object located on Lane A and a moving object located on Lane B move or drive along the guidelines 801 and 802 at the same time, a collision may occur. Accordingly, it is necessary to determine a priority order between the moving object located on Lane A and the moving object located on Lane B. An operation of determining a priority order of a moving object is described in detail in FIG. 10 below.

Figure 9:
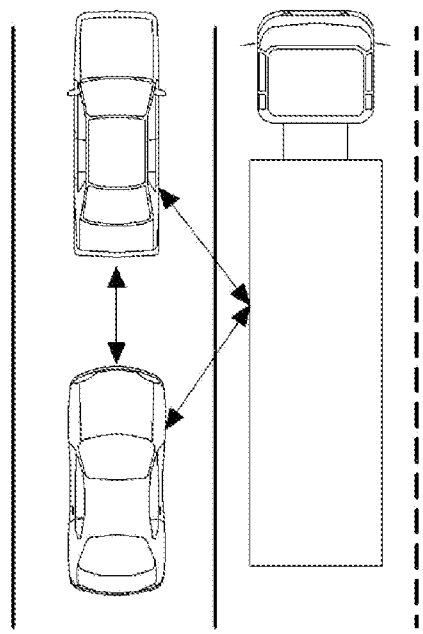
FIG. 9 is a view exemplarily illustrating a method of exchanging driving guideline information between moving objects according to various exemplary embodiments of the present invention.

FIG. 9 is a view exemplarily illustrating a method of exchanging left-turn guideline information between moving objects. Referring to FIG. 9, based on what is described above, a moving object may share information on a left-turn guideline with another moving object. A moving object may stop to make a left turn at an intersection. Herein, the moving object may generate and provide a left-turn guideline by detecting that it stops and a left-turn signal light is turned on. As an example, an autonomous vehicle may automatically turn on a left-turn signal light when the moving object stops at an intersection, but is not limited to the above-described embodiment. Herein, as an example, the left-turn guideline may be generated based on at least one of a size and a position of the moving object, as described above. Furthermore, the left-turn guideline may be set based on at least one of a starting point of left turn, an end point of left turn, road length, the number of lanes, and road information, as described above.

Herein, the moving object may exchange information on the left-turn guideline thus generated with another moving object. As an example, the moving object may exchange information on the left-turn guideline with another moving object located within a preset distance from the moving object. As various exemplary embodiments of the present invention, the moving object may exchange information on the left-turn guideline with another moving object adjacent to the moving object, which will be described below.

Herein, the moving object may examine a possibility of collision based on the left-turn guideline information which is exchanged with a neighbor moving object. As an example, the moving object may check the information on a left-turn guideline of another moving object which is located on the same row but on a different lane and may identify a possibility of collision. Herein, when there is a possibility of collision, the moving object may determine a priority order of driving by exchanging a message with a neighbor moving object and may drive based on this.

Figure 10:
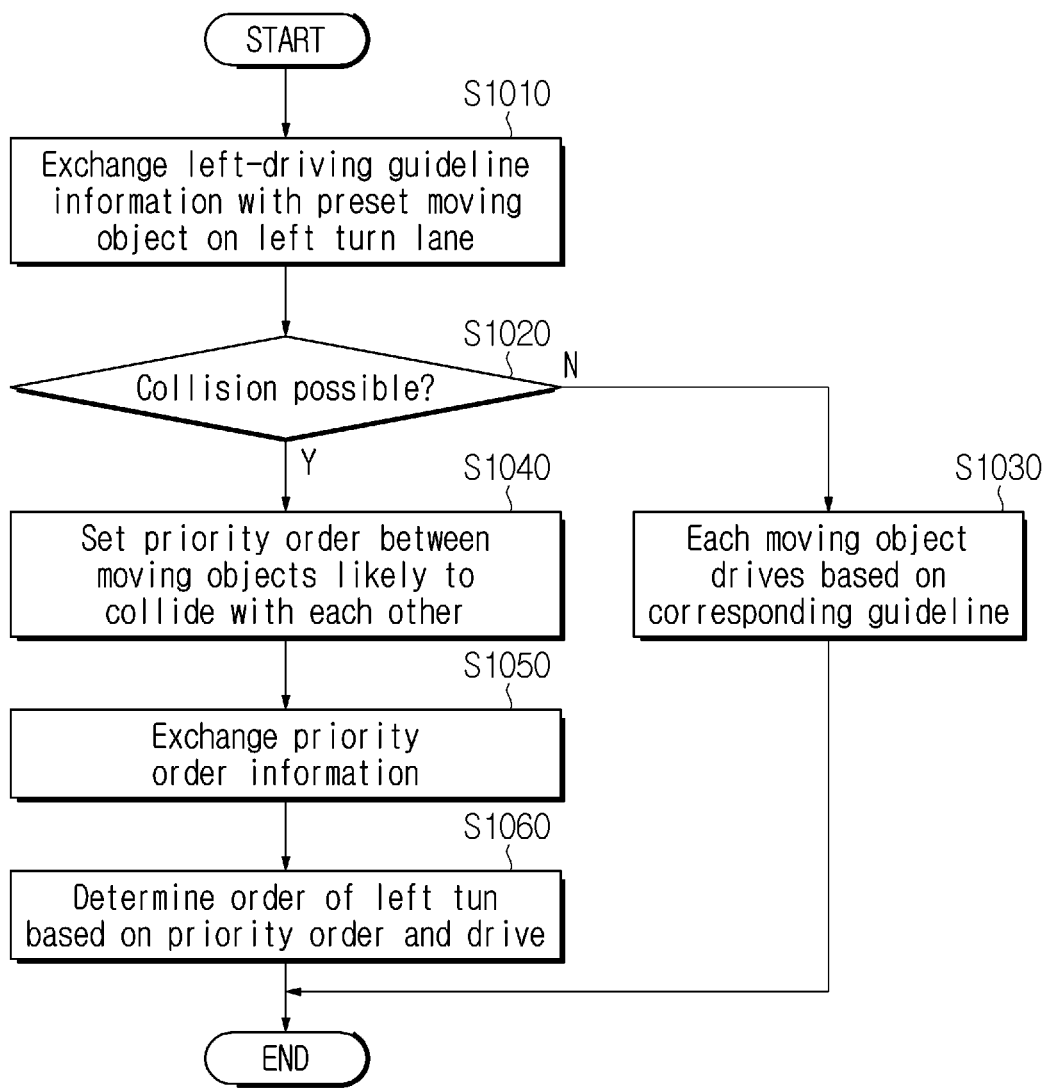
FIG. 10 is a view exemplarily illustrating an example of method of performing a turn of a moving object based on a priority order, according to various exemplary embodiments of the present invention.

FIG. 10 is a view showing an example of method by which moving objects make a left turn based on a priority order.

Referring to FIG. 10, a moving object may generate and provide a left-turn guideline, as described above. Herein, the moving object may exchange information on the left-turn guideline with a preset moving object on a left-turn lane (S1010). Herein, the preset moving object may mean a moving object which is within a predetermined distance or is adjacent. Herein, the moving object may identify whether or not there is a possibility of collision based on the exchanged information (S1020). As an example, when there is no possibility of collision in the moving object, the moving object may drive based on a corresponding guideline (S1030). On the other hand, it is possible to consider a case in which there is a possibility of collision in the moving object. That is, as described above, when a moving object has a large size or its position is not obvious, a left-turn a left-turn guideline going over to another lane may be generated and provided. Herein, the moving object may check whether or not there is an overlapping area based on exchanged information on a left-turn guideline and may determine a possibility of collision based on the overlapping area. For example, a moving object like a truck or a trailer cannot make a turn within a lane predetermined to the moving object and may generate a left-turn guideline going over the predetermined lane. Thus, a moving object may determine whether or not there is an overlapping area and whether or not there is a possibility of collision by checking left-turn guideline information which is exchanged from another moving object like a lorry or a trailer.

Herein, the moving object may determine a priority order with a moving object with which it may collide. That is, the moving object may determine a driving order (S1040). Herein, as an example, the moving object may determine a priority order between moving objects based on a position of a moving object, a size of a moving object, or a back off value which is randomly determined. For example, as shown in Table 1 below, moving objects may be classified into the following groups based on the wheel 1101 of moving object, the overall width 1102 of moving object, the overall length 1103 of moving object, and the wheelbase 1104 of moving object.

TABLE 1

| Types of moving objects | Criteria of classification | Priority |
|---|---|---|
| Group 1 | Two axle vehicle, overall width of 279.4 mm and less | 4 |
| Group 2 | Two axle vehicle, overall width of over 279.4 mm, wheelbase of 1,800 mm and less | 4 |
| Group 3 | Two axle vehicle, overall width of over 279.4 mm, wheelbase of over 1,800 mm | 3 |
| Group 4 | Three axle truck | 2 |
| Group 5 | Four or more axle truck | 1 |

Referring to Table 1, a moving object of Group 1 may be a vehicle with a relatively smaller size than a moving object of Group 5. Furthermore, moving objects of Group 3, Group 4 and Group 5 are incapable of make a turn within a single lane and require at least two lanes for a turn. Based on this, moving objects of Group 3, Group 4 and Group 5 need to make a turn in a sequential order based on priority. In the step S1040, a moving object may check whether the group of the moving object is Group 3, Group 4 or Group 5, and when the group of the moving object is Group 3, Group 4 or Group 5, a priority order may be set. Herein, a higher priority may be set to a group consisting of moving object with relatively larger sizes. Furthermore, for moving objects classified into a same group, a priority order may be randomly set. Meanwhile, since moving objects of Group 1 and Group 2 are capable of make a turn within a single lane, a same priority may be provided to the moving objects of Group 1 and Group 2. Although, an exemplary embodiment of the present invention classifies moving objects into the groups based on the criteria presented in Table 1, the present invention is not limited thereto, and the criteria for classifying moving objects into groups may be modified in various ways. For example, moving objects may be classified into groups using the criteria of the wheel 1101 of moving object, the overall width 1102 of moving object, the overall length 1103 of moving object, and the wheelbase 1104 of moving object for each moving object type (e.g., Click®, Avante®, Sonata®, Grandeur®, Genesis®, Porter®, Starex®, Tuscan®, Santafe®, Palisade®, Megatruck®, New Powertruck® etc.). Groups may be distinguished based on the wheel 1101, the overall width 1102, the overall length 1103 and the wheelbase 1104 of moving objects with a same or similar size. For example, Click® and Avante® may be classified into Group 1, Sonata® and Tuscan® may be classified into Group 2, Grandeur®, Genesis®, Santafe® and Palisade® may be classified into Group 3, Porter® and Starex® may be classified into Group 4, and Megatruck® and New Powertruck® may be classified into Group 5.

As described above, to determine a priority order in the step S1040 by considering the wheel 1101 of moving object, the overall width 1102 of moving object, the overall length 1103 of moving object and the wheelbase 1104 of moving object, when exchanging information on a left-turn guideline (S1010), a moving object may also exchange information capable of identifying the wheel 1101 of moving object, the overall width 1102 of moving object, the overall length 1103 of moving object, and the wheelbase 1104 of moving object. For example, a moving object may exchange information on a type of moving object in the step S1010, and the moving object may identify a moving object group corresponding to the type in the step S1040. As various exemplary embodiments of the present invention, in the step S1010, a moving object may identify a type of moving object, determine the wheel 1101 of moving object, the overall width 1102 of moving object, the overall length 1103 of moving object and the wheelbase 1104 of moving object, which correspond to the type of moving object, and exchange the determined information.

Next, the moving object may exchange priority information with another moving object and determine the priority information (S1050) and drive by determining an order of left turn based on the priority (S1060). Thus, when a left-turn guideline is given, the moving object may avoid colliding with another moving object.

Figure 12:
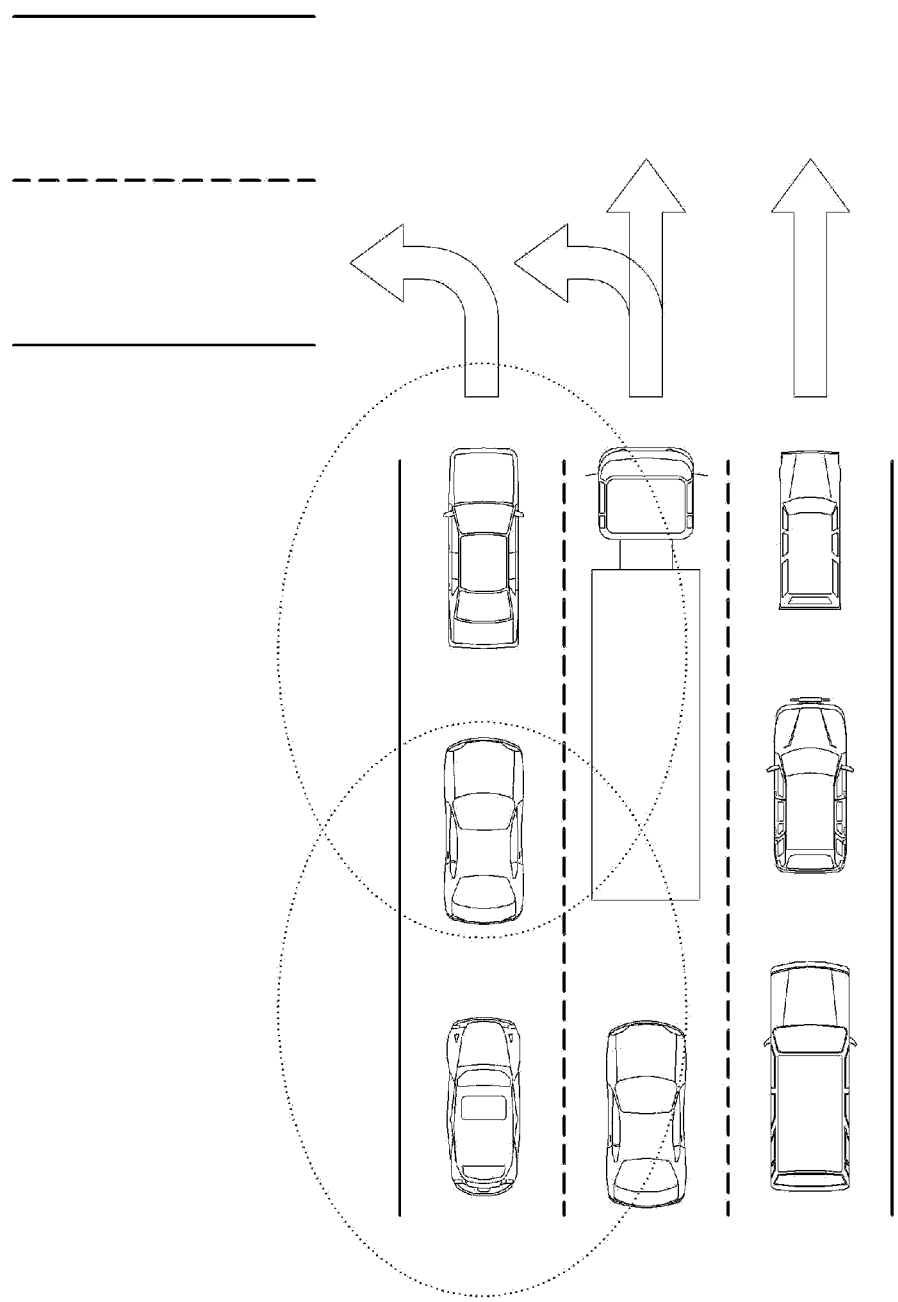
FIG. 12 is a view exemplarily illustrating a moving object exchanging driving guideline information according to various exemplary embodiments of the present invention.
Figure 13:
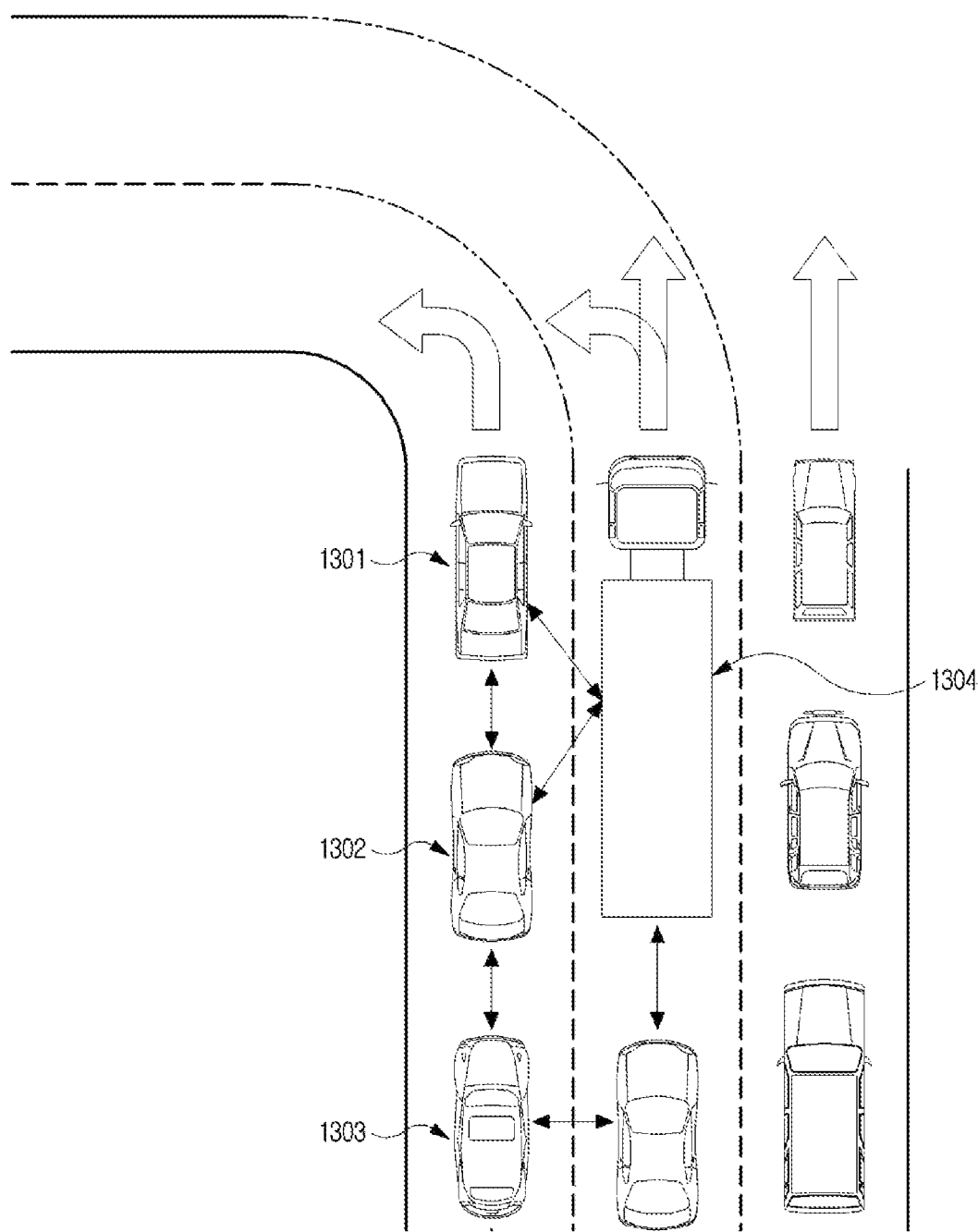
FIG. 13 is a view exemplarily illustrating a moving object exchanging driving guideline information according to various exemplary embodiments of the present invention.

FIG. 12 and FIG. 13 are views exemplarily illustrating moving objects that exchange left-turn guideline information.

Figure 11:
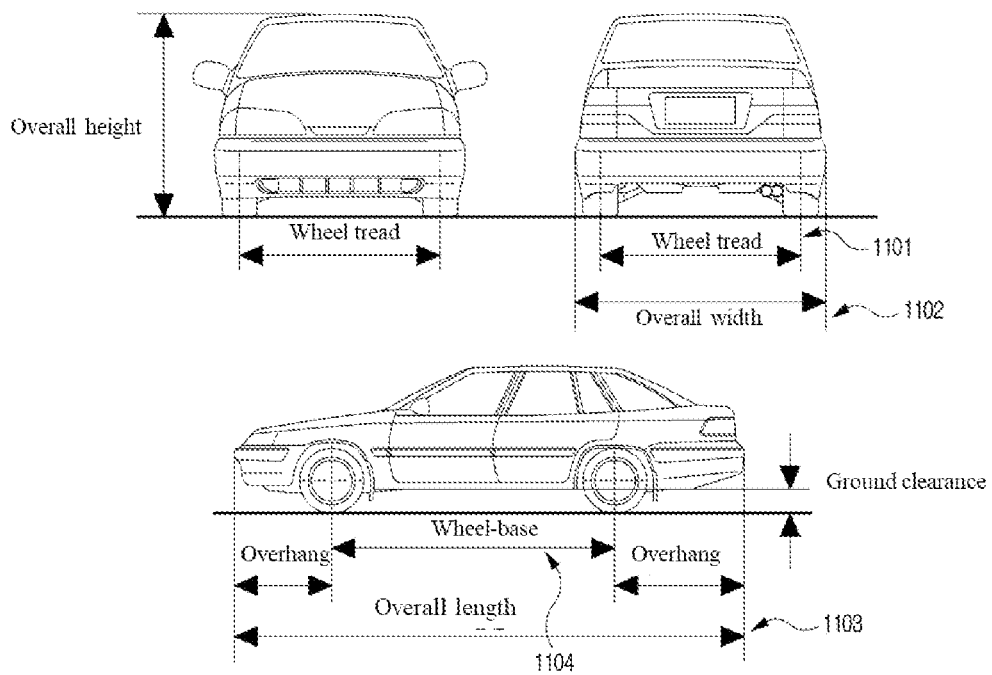
FIG. 11 is a view exemplarily illustrating the wheel, overall width, overall length and wheelbase of a moving object used in various exemplary embodiments of the present invention.

Referring to FIG. 12, a moving object may generate a left-turn guideline and share its information with another moving object. However, for a moving object located beyond a predetermined distance or a moving object located on a straight lane, it is not necessary to share information on a left-turn guideline. When the information described above is exchanged, an unnecessary communication may be performed, which may result in a delay. In view of what is described above, referring to FIG. 11, a moving object may exchange information on a left-turn guideline with another moving object located within a predetermined distance from the moving object. As a more specific example, a predetermined distance may be a distance from a moving object to a next lane and from the moving object to another moving object ahead or behind. That is, a moving object may exchange information on a left-turn guideline with moving objects located on left and right side lanes respectively, and with moving objects ahead and behind respectively. However, a predetermined distance may be set in various ways and is not limited to the above-described embodiment. As an example, a predetermined distance may be differently set by considering a size of lane or a position of a moving object but is not limited to the above-described embodiment.

Furthermore, as an example, referring to FIG. 13, a moving object may exchange information on a left-turn guideline with another moving object capable of transmitting a signal with no obstacle in between. That is, a moving object may exchange information on a left-turn guideline with moving objects immediately adjacent, on the left and right, ahead and behind, to the moving object. As an example, a moving object 1301 may exchange information on a left-turn guideline with another moving object 1302, 1304 located within a single hop. Herein, the hop may be a relation of moving objects 1302, 1303, 1304 that are neighboring around the moving object 1301. As an example, the number of hops for a closest moving object 1302, 1304 neighboring around the moving object 1301 may be 1. Furthermore, the number of hops of a moving object 1303 immediately next to the moving object 1302 with 1 hop may be 2. That is, a hop number may be determined based on the number of moving objects located around a target moving object.

Herein, as an example, since a moving object incapable of directly transmitting a signal because of the interruption of another moving object may not be an adjacent moving object, there may be no or a low possibility of colliding with the moving object. Accordingly, a moving object may share information on a left-driving guideline with another moving object capable of transmitting a signal with no obstacle in between, and based on this, may determine a priority order of left turn.

Figure 14:
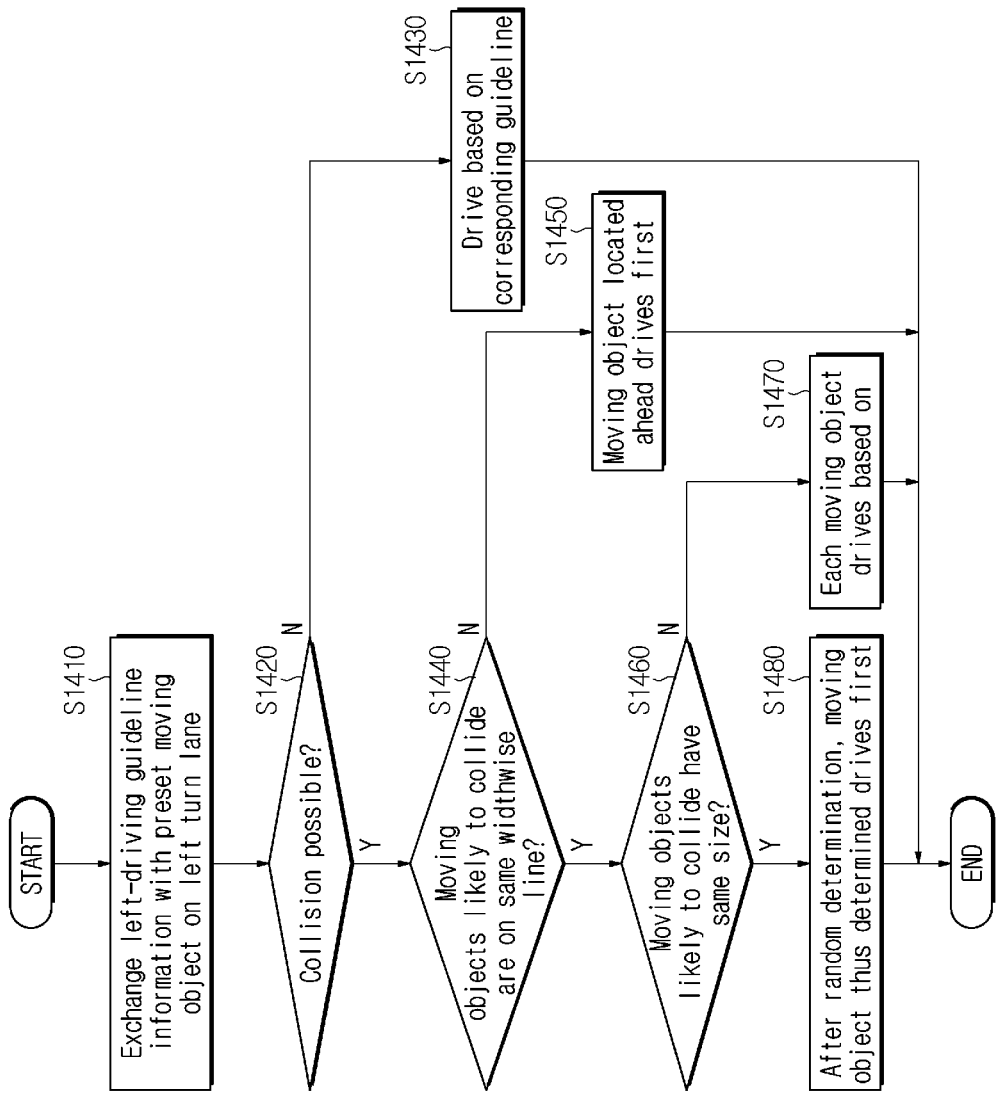
FIG. 14 is a view exemplarily illustrating a method by which a moving object determines a priority order based on driving guideline information, according to various exemplary embodiments of the present invention.

FIG. 14 is a view showing a method by which a moving object determines a priority order based on a left-turn guideline information.

Referring to FIG. 14, a moving object may exchange information on a left-turn guideline with a preset moving object on a left-turn lane (S1410). Herein, as an example, as described above, the moving object may exchange the information on a left-turn guideline with a moving object which is adjacent to according to a predetermined condition. Herein, the moving object may determine a possibility of collision based on the information on left-turn guideline (S1420). Herein, when there is no possibility of collision, each moving object may drive based on the guideline (S1430). On the other hand, when there is a possibility of collision, it may be determined whether or not moving objects likely to collide are actually located on an approximately similar line (S1440). Herein, when the moving objects likely to collide are not actually located on the approximately similar line, a moving object located ahead may drive first (S1450). That is, a priority may be provided to a moving object located ahead while being stopped. As an example, moving objects having a possibility of collision may share a priority order as described above and thus a moving object located ahead may drive first.

Figure 15:
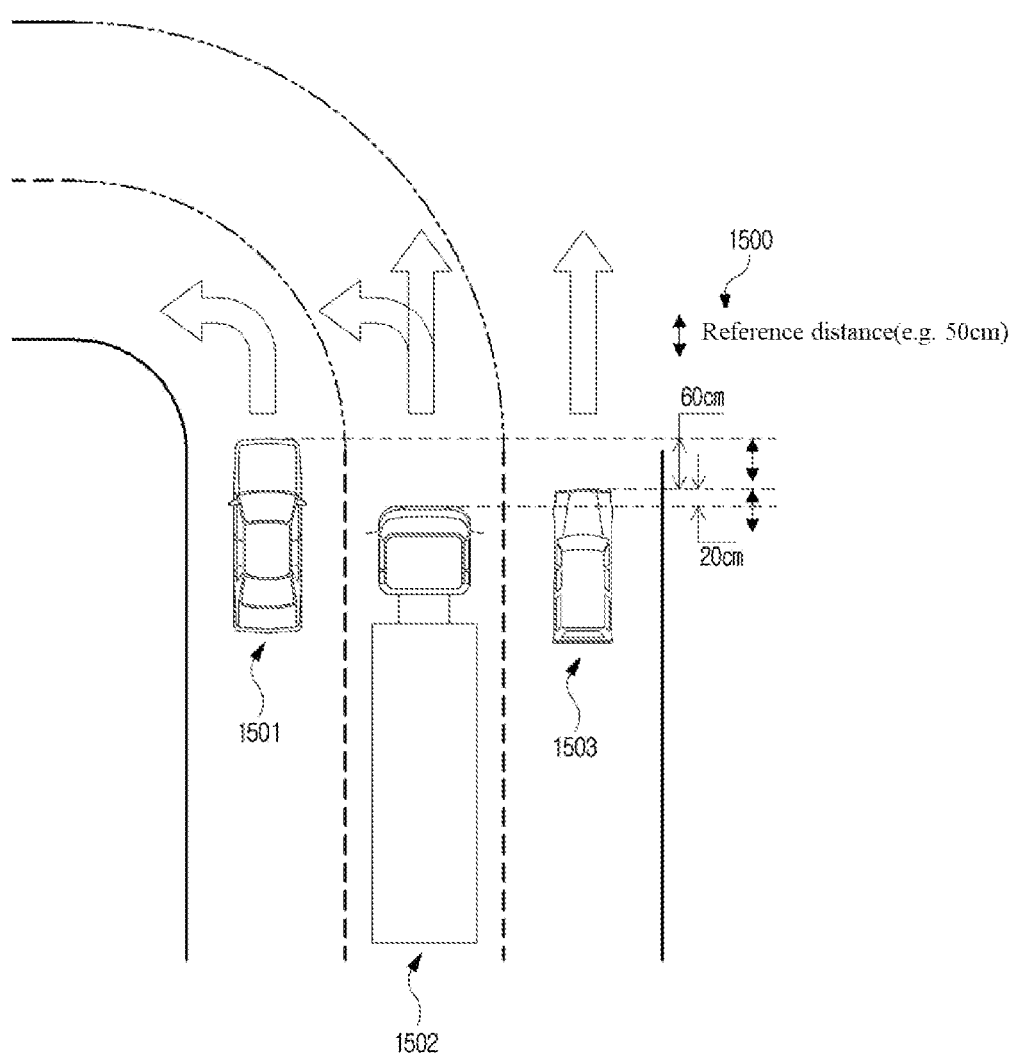
FIG. 15 is a view exemplarily illustrating a method of determining whether or not a moving object is actually located on a same lane, according to various exemplary embodiments of the present invention.

On the other hand, it is possible to consider a case in which moving objects likely to collide are actually located on an approximately similar line. Herein, as an example, the actual approximately similar line does not mean that the fore-ends of neighbor moving objects 1501, 1502 and 1503 (refer to FIG. 15) does not physically and accurately correspond to one another. It may mean that the moving objects are located within a predetermined reference distance 1500 so that it is hard to determine whether or not a moving object is ahead of another moving object. For example, it may be assumed that the predetermined reference distance 1500 is set to 50 cm, a distance between the fore-end of a first moving object 1501 and the fore-end of a second moving object 1502 is 60 cm, and a distance between the fore-end of the second moving object 1502 and the fore-end of a third moving object 1503 is 20 cm. In such a situation, since the distance between the fore-end of the first moving object 1501 and the fore-end of the second moving object 1502 exceeds the present reference distance 1500, it may be determined that the first moving object 1501 is ahead of the second moving object 1502. Furthermore, since the distance between the fore-end of the second moving object 1502 and the fore-end of the third moving object 1503 is less than the present reference distance 1500, it may be determined that they are actually located on the approximately similar line.

Meanwhile, when moving objects likely to collide are actually located on the approximately similar line, the moving objects likely to collide may compare the sizes of the moving objects (S1460). Herein, when the sizes of the moving objects are not same, a larger moving object may drive first (S1470). That is, a priority may be provided to a larger moving object among moving objects that are located on an approximately similar line but are likely to collide. On the other hand, it is possible to consider a case where moving objects likely to collide have a same size. As an example, when moving objects have a same size, it does not mean that they are same in a physical size but may rather mean that they have similar sizes within a preset difference of size. As an example, moving objects belonging to a same moving object type (e.g., sedan) may be determined to have a same size. Herein, as an example, when moving objects have a same size, a moving object driving first may be randomly determined (S1480). Herein, as an example, as for driving of moving objects, a moving object likely to help a surrounding traffic situation or other moving objects may be determined to drive first. Furthermore, as an example, back off values that are randomly set between moving objects may be compared to determine a priority order.

Accordingly, moving objects may exchange information on a priority order and a moving object with a higher priority may drive first, preventing a collision which may occur by providing a left-turn guideline.

Figure 16:
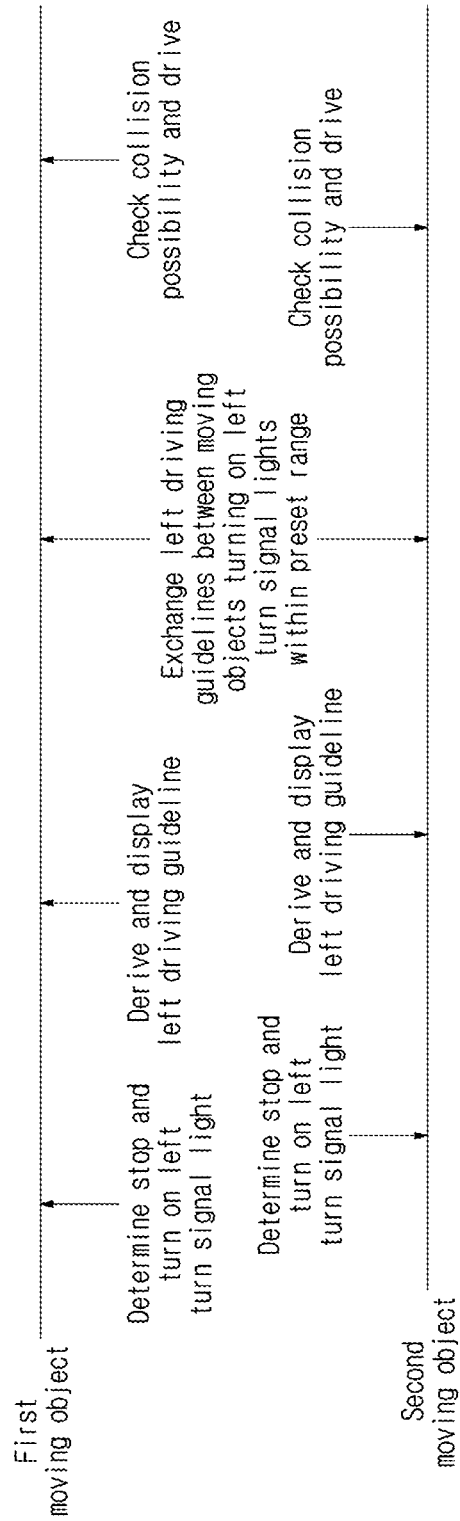
FIG. 16 is a view exemplarily illustrating a method of mutually exchanging driving guideline information between moving objects according to various exemplary embodiments of the present invention.

FIG. 16 is a view showing a method of mutually exchanging left-turn guideline information between moving objects.

Referring to FIG. 16, a first moving object and a second moving object may stop at an intersection in order to make a left turn. Next, the first moving object and the second moving object may turn on left-turn signal lights respectively. Based on this, respective left-turn guidelines may be generated. As an example, when the first moving object and the second moving object make a left turn without stopping based on an intersection signal, the first moving object and the second moving object may generate and provide respective left-turn guidelines while left-turn signal lights are turned on.

Although, in various exemplary embodiments of the present invention, a turn guideline is generated as a response to a state where a turn signal light is turned on, the present invention is not limited thereto, and an environment for generating a guideline may be modified in various ways. For example, a position of a moving object, a driving condition of a moving object and a speed of a moving object may be considered to control the generation of a guideline, and a relevant configuration and operations will be described in detail with reference to FIG. 20A, FIG. 20B and FIG. 21 below.

Herein, as an example, when moving objects do not stop but keep driving and determine a priority order by exchanging left-turn guideline information as described above, a moving object with a lower priority may reduce its speed or change its left-turn guideline in order not to interrupt the driving of another moving object with a higher priority. However, the present invention is not limited to the above-described embodiment.

Meanwhile, moving objects may derive and display respective left-turn guidelines. Herein, while a first moving object and a second moving object are located within a preset range and have turned on left-turn signal lights respectively, the moving objects may exchange information on respective left-turn guidelines. Next, the first moving object and the second moving object may drive after checking respective possibilities of collision. Herein, as an example, it is possible to consider a case where the first moving object stops and turns on its left-turn signal light before the second moving object. However, based on information exchanged by the first moving object and the second moving object, the second moving object may have priority for left turn. In consideration of the above description, even when the second moving object stops later, it may make a left turn first. That is, a left turn may be made through information which is derived based on left-turn guideline information and may not correspond to an order of stopping.

Figure 17:
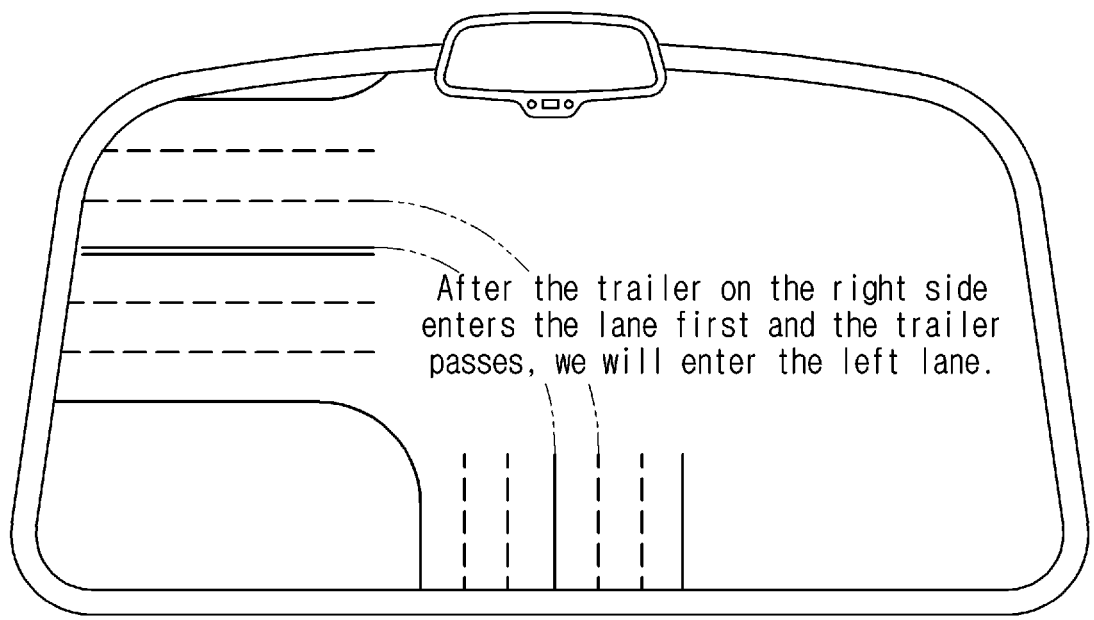
FIG. 17 is a view exemplarily illustrating a method of outputting relevant information through an augmented reality navigation system based on driving guideline information, according to various exemplary embodiments of the present invention.

FIG. 17 is a view exemplarily illustrating a method of outputting relevant information through an augmented reality navigation system based on left-turn guideline information.

Referring to FIG. 17, a moving object may provide information on a left-turn guideline based on at least one of an augmented reality navigation system, an HUD and an LDM. Herein, as an example, as described above, the moving object may share the information on a left-turn guideline with another moving object and make a left turn. Herein, as an example, when a moving object is an autonomous vehicle, the moving object may autonomously make a left turn based on a determined priority order. Herein, as an example, the moving object may display the information on a left turn ("After the trailer on the right side enters the lane first and passes, we will enter the left lane.") which is made based on a left-turn guideline. Thus, a user may confirm the driving information related to an autonomous vehicle.

As various exemplary embodiments of the present invention, when a moving object is not an autonomous vehicle, the moving object may provide information based on a left-turn guideline to a user. Herein, the moving object may display information related to the left-turn guideline, as described above. Furthermore, as an example, a moving object may output a voice prompt (e.g., "Stand by turn.", "Turn is being made.", etc.) notifying a turn of the moving object through a speaker. As an example, a user of a moving object may control and drive the moving object based on displayed information and a left-turn guideline. Meanwhile, as an example, when a user of a moving object does not drive the moving object based on information on a left-turn guideline, the moving object may provide a warning sound like an alarm to the user but is not limited to the above-described embodiment.

FIGS. 18A to 18D are views exemplarily illustrating a method of generating a left-turn guideline. As described above, a left-turn guideline may be generated in a moving object. Herein, as an example, the left-turn guideline may be set based on at least one of a starting point of left turn, an end point of left turn, road length, the number of lanes, and road information, as described above.

Figure 18A:
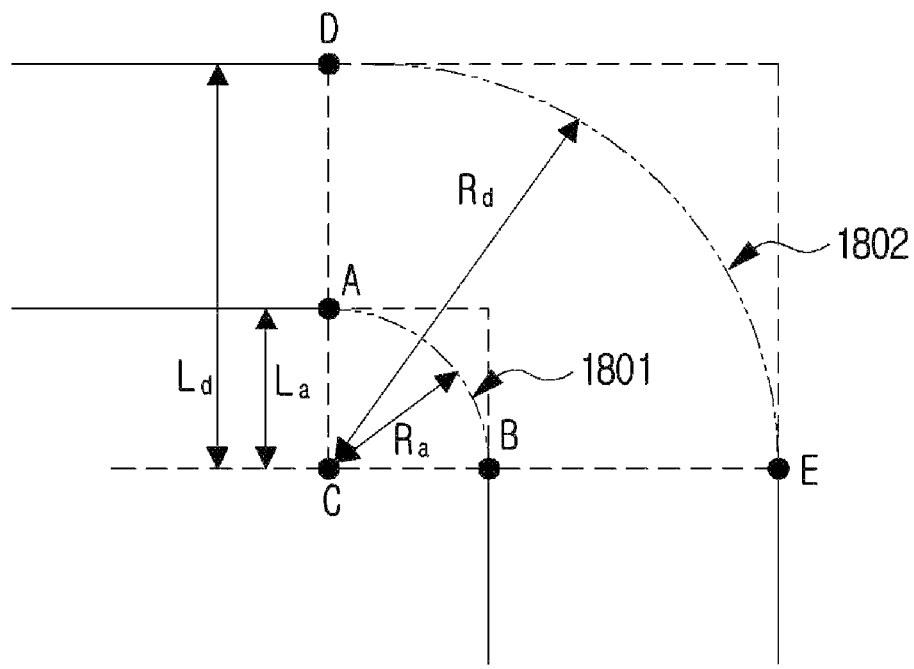
FIG. 18A, FIG. 18B, FIG. 18C and FIG. 18D are views exemplarily illustrating a method of generating a driving guideline according to various exemplary embodiments of the present invention.

As a specific example of generating a left-turn guideline, referring to FIG. 18A, a moving object may recognize an end point of an intersection, in which a left turn is made, and a starting point of a road that the moving object enters after the left turn. Herein, the starting point may be Point B, and the end point may be Point A. Herein, the moving object may derive Point C based on a point where an extension of Point A and an extension of Point B intersect. That is, the virtual point C may be derived from the extension of Point A and the extension of Point B, and a guideline may be derived based on Point C. As an example, a guideline 1801 may be set on a circle that has the distance ($L_a$) between Point A and Point C as its radius ($R_a$). Furthermore, a guideline 1802 may be set on a circle that has the distance ($L_d$) between Point C and Point E or Point D, which are an end point of road, as its radius ($R_d$).

Figure 18B:
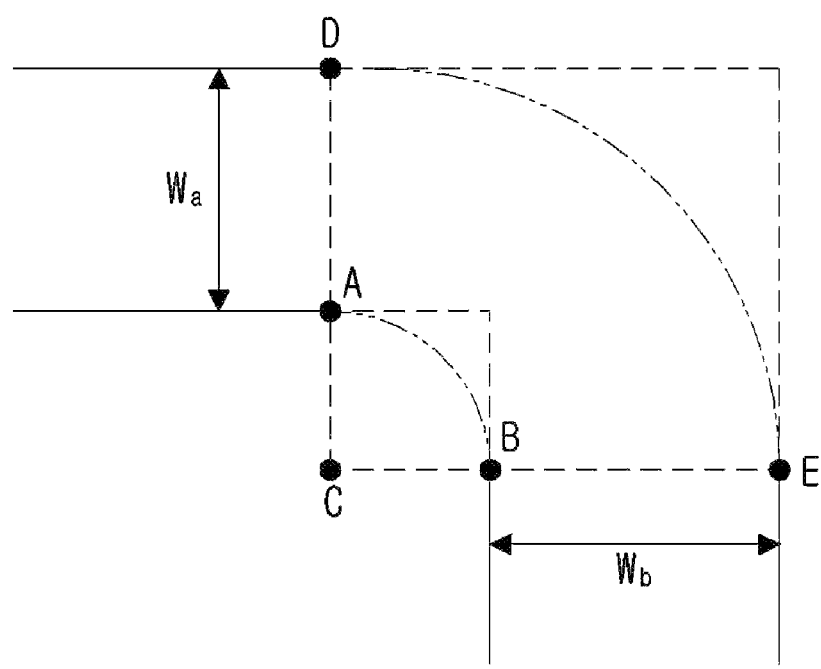

Herein, as an example, referring to FIG. 18B, a guideline may be set by further considering other information. As an example, a moving object may adjust a position of a guideline based on the road width ($W_a$), that is, the distance between Point A and Point D, or the road width ($W_b$), that is, the distance between Point B and Point E.

Figure 18C:
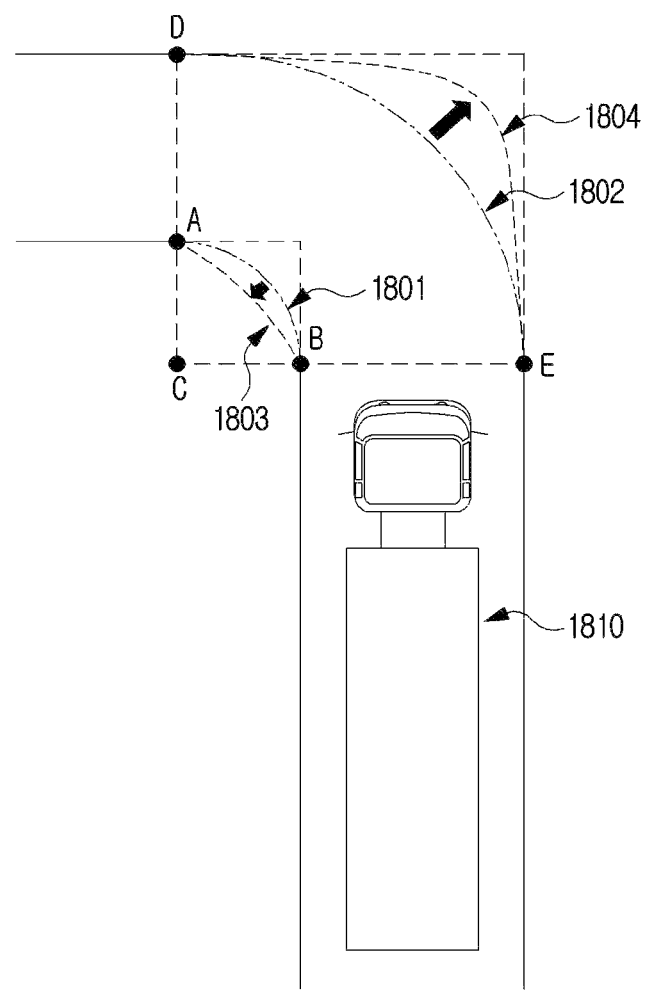

As various exemplary embodiments of the present invention, referring to FIG. 18C, a moving object may adjust a position of a guideline based on a length of a moving object 1810 (e.g., the wheel of the moving object, the overall width of the moving object, the overall length of the moving object, and the wheelbase of the moving object). For example, a moving object may determine the guideline 1801 generated based on the radius ($R_a$) and the guideline 1802 generated based on the radius ($R_d$) and check whether or not the moving object 1810 is capable of moving or driving along a guideline by considering a length of the moving object 1810 (e.g., the wheel of the moving object, the overall width of the moving object, the overall length of the moving object, and the wheelbase of the moving object). When the moving object 1810 is incapable of driving along a guideline, the moving object 1810 may reset the guidelines 1803 and 1804 by reflecting a length of the moving object 1810 (e.g., the wheel of the moving object, the overall width of the moving object, the overall length of the moving object, and the wheelbase of the moving object).

Figure 18D:
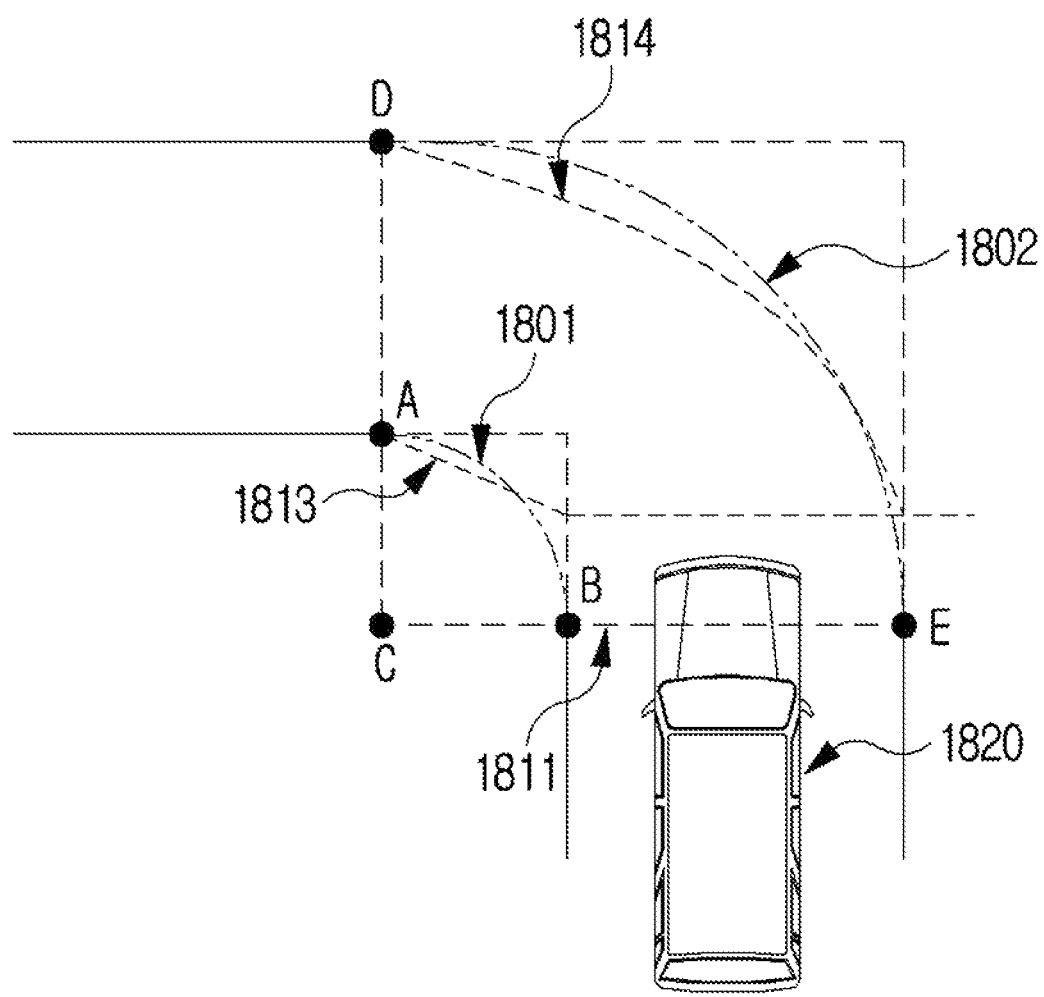

As various exemplary embodiments of the present invention, referring FIG. 18D, a guideline may be adjusted based on a stop position of a moving object. As an example, a moving object 1820 may stop past a reference point 1811 (a line connecting Point B and Point E) of intersection. Herein, since the moving object 1820 is ahead of the reference point 1811 of intersection, the moving object 1820 cannot move or drive along a guideline which is generated by considering the reference point 1811. With this being considered, the moving object 1820 may check a stop line 1812 of the moving object 1820 and reset guidelines 1813 and 1814 by considering the stop line 1812 of the moving object 1820.

Furthermore, as various exemplary embodiments of the present invention, a guideline may be adjusted by considering a speed of a moving object. As an example, a moving object may make a left turn after stopping at an intersection. As various exemplary embodiments of the present invention, a moving object may make a left turn without stopping at an intersection. Herein, if not stopping, the moving object may adjust a guideline position by reflecting a speed of the moving object. As an example, when the speed of a moving object is higher than a predetermined speed, the moving object may increase a width of the guideline. As various exemplary embodiments of the present invention, a guideline may be adjusted according to a road surface condition. As an example, when a climate condition is snow or rain, a distance necessary for a moving object to make a left turn may increase. In consideration of the above description, a moving object may adjust a guideline.

That is, a moving object may generate a basic guideline based on FIG. 18A and modify the position of the guideline by considering various factors in the generated guideline. Meanwhile, when a position of a guideline is generated or modified, it may overlap with a guideline of another moving object, which may result in a possibility of collision, as described above.

Figure 19:
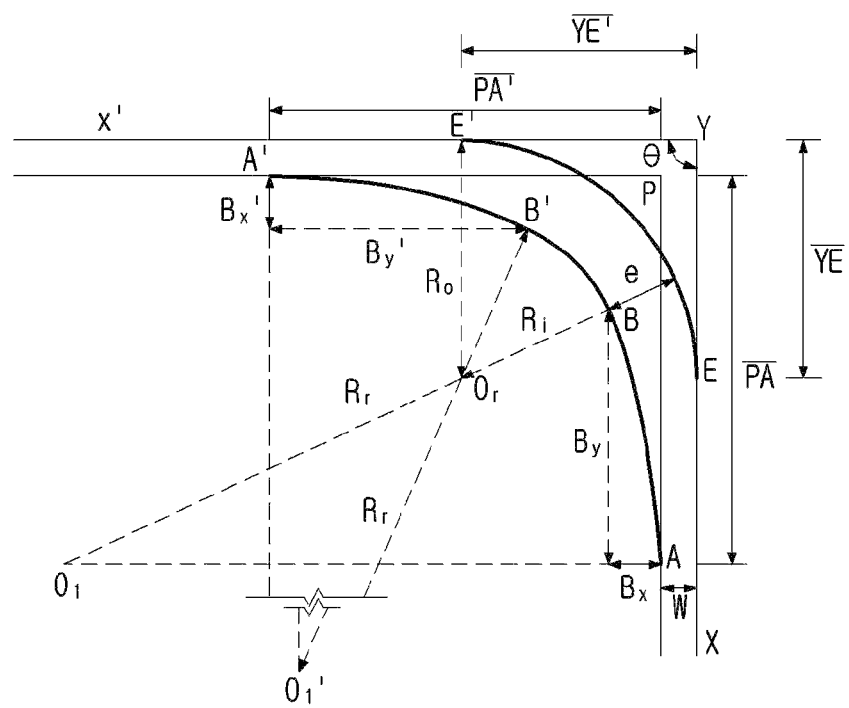
FIG. 19 is a view exemplarily illustrating a method of deriving a driving guideline according to various exemplary embodiments of the present invention.

Furthermore, FIG. 19 is a view exemplarily illustrating a specific method for generating a guideline. As an example, a moving object may derive a guideline through detected information or information which is obtained through a map or a navigation system. As an example, referring to FIG. 19, it is possible to derive APA' which is placed at a distance of a lane width W from the outside thereof lane XYX'. Next, a moving object may determine the external circle radius $R_o$ and the positions of the starting point E and the end point E' of the external circle contacting with the outside lane XYX' based on Equation 1 below. Herein, based on Equation 1, the arc EE' connecting the points E and E' by the radius $R_o$ may be derived.

$$\overline{YE} = \overline{YE'} = \frac{R_O}{\tan(\theta/2)} \qquad \text{Equation 1}$$

Furthermore, based on Equation 1 described above, a lane width widening S (=e−w) may be determined using the road width W and a channelized lane width e, and an internal circle radius $R_i$ (=$R_o$−e) may be determined using the external circle radius $R_o$ and the channelized lane width e by a designed car. Next, the transition curve $R_r$ (=nX $R_i$), which is n times the internal circle radius $R_i$, may be determined. Furthermore, the positions of the starting point A and the end point A' of a transition curve contacting with the inside lane APA' may be derived based on Equation 2.

$$\overline{PA} = \overline{PA'} = \sqrt{2(n-1)R_iS - S^2} + \frac{(R_i + S)}{\tan(\theta/2)} \qquad \text{Equation 2}$$

Furthermore, the positions of the end points B and B' of the transition curves AB and A'B' may be determined based on Equation 3 below.

$$B_y = B_{y'} = \frac{n}{n-1}\sqrt{2(n-1)R_iS - S^2} \qquad \text{Equation 3}$$

$$B_x = B_{x'} = \frac{n}{n-1}S$$

Next, the transition curve AB connecting the points A and B by the radius $R_r$ may be derived, and the transition curve B'A' connecting the points B' and A' by the radius $R_r$ may be derived. Next, the arc BB' connecting the points B and B' by the radius $R_i$ may be derived, and a guideline may be generated based on the above description.

However, the above-described method is only an example, and a guideline may also be derived by a different method. Furthermore, as an example, when a guideline is derived, a road surface condition may be considered. The surface condition of a road may vary according to season and time. As an example, when a road surface condition is favorable, a moving object may have no problem in making a turn along a guideline. On the other hand, when a road surface condition is not favorable like a freezing road and a guideline is narrow, a moving object may have a problem in make a turn along a guideline. With this being considered, a moving object may consider a road surface condition when deriving a guideline. As an example, a moving object may obtain information on a road surface condition before deriving a guideline. Herein, the moving object may obtain the information on road surface condition directly from a sensor provided in the moving object. Furthermore, as an example, the moving object may obtain the information on road surface condition through another device or a server based on a map or navigation. However, the present invention is not limited to the above-described embodiment. Herein, as an example, the information on road surface condition may be derived as a certain value. For the information on road surface condition, a reference value may be set as a normal condition, and based on the reference value, a road surface condition may be expressed as a value. Thus, information on whether or not a road surface is favorable may be provided to a moving object. Herein, when a road surface condition is favorable beyond a reference value, a moving object may derive a guideline as described above. On the other hand, when a road surface condition is less than a reference value, that is, when a degree of slipperiness indicates a state of being more slippery than the reference value, a moving object may configure a guideline by setting a turning radius greater than illustrated in FIG. 19 and a relevant description. Herein, the degree of slipperiness may be indicated as a slip ratio which may be determined based on a relation between the speed of a moving object and the speed of a moving object wheel and be identified through Equation 4 below, for example.

$$\text{Slip ratio} = \frac{V - Vt}{V} * 100 \qquad \text{Equation 4}$$

In Equation 4, V represents a speed of a moving object, and Vt represents a speed of moving object wheel.

In consideration of what is described above, the curve connecting E and E' in FIG. 19 may be increased based on the above-described equations. As various exemplary embodiments of the present invention, when a road surface condition is less than a reference value, a moving object may increase the sizes of radii $R_i$, $R_0$ and $R_r$ that become the criteria of a guideline or may apply a predetermined weight to the radii $R_i$, $R_0$ and $R_r$. Furthermore, as an example, in FIG. 19, a moving object may increase a width necessary for a turn by increasing the value of W based on a road surface condition. That is, when deriving a guideline based on FIG. 19 described above, a moving object may consider information on a road surface condition.

Furthermore, a moving object may adjust a guideline by reflecting a turn speed, as described above, and when configuring a guideline by considering information on a road surface condition, the moving object may reflect the turn speed together. For example, when a turn speed of a moving object is less than a predetermined reference value, the moving object may determine a guideline without considering a road surface condition. On the other hand, when a turn speed of a moving object exceeds a predetermined reference value, the moving object may configure a guideline by considering information on a road surface condition. As various exemplary embodiments of the present invention, a predetermined reference value may be configured in stages, and information reflecting a road surface condition may be differently applied according to each stage.

As various exemplary embodiments of the present invention, a moving object may generate a guideline by considering the center of gravity of the moving object. Herein, as an example, the center of gravity of the moving object may be considered as an additional variable in the above-described equations. As an example, when the center of gravity of a moving object is low and little affected by a turn, the curve of a guideline may be set to be steep. On the other hand, when the center of gravity of a moving object is high and much affected by a turn, a guideline may be set to be gentle. Herein, as an example, the center of gravity of the moving object may information which is already stored based on information set in the moving object. Furthermore, as an example, the center of gravity of the moving object may be individually determined by considering a road condition or the number of passengers in the moving object. That is, a moving object may derive a value for the center of gravity by considering the weight of the moving object reflecting a road condition and the number of passengers along with the preset information on the center of gravity. Herein, the moving object may compare the value thus derived with a reference value and reflect the information obtained from the comparison with the reference value in the above-described equations as a variable. As an example, a value for the center of gravity may be an influential variable when determining the position of $O_1$ in FIG. 19. As an example, when the center of gravity is low and not significantly affected by a turn, $O_1$ may become nearer and the curves EE' and BB' may be steeply generated. On the other hand, when the center of gravity is high and much affected by a turn, $O_1$ may become farther and the curves EE' and BB' may be gently generated.

As various exemplary embodiments of the present invention, a guideline may be determined by further considering a distance between the front axle and rear axle of a moving object. Herein, as an example, the front axle and rear axle of the moving object may be information which is preset in the moving object. As an example, when a moving object derives a guideline based on FIG. 19 described above, the information on a distance between the front axle and rear axle of the moving object may be further reflected. The information on a distance between a front axle and a rear axle may increase the curve connecting E and E' based on the above-described equations. Furthermore, as an example, in FIG. 19, a moving object may increase a width necessary for a turn by increasing the value of W. Furthermore, as an example, a moving object may increase the lengths of $\overline{PA}$ and $\overline{PA'}$ in FIG. 19 by reflecting the information on a distance between a front axle and a rear axle. That is, a moving object may increase a turn by reflecting information on a front axle and a rear axle for the length of turn.

That is, when a moving object generates a guideline based on FIG. 19 described above, the moving object may change the setting of the guideline by further utilizing road information or other information set to the moving object, making the guideline suitable for the moving object.

As described in FIG. 16, a moving object may identify a situation requiring a guideline to be generated by considering its position, its driving condition and its speed.

Hereinafter, referring to FIG. 20A, FIG. 20B and FIG. 21, an operation of identifying a situation requiring a guideline to be generated will be described in detail.

Figure 20A:
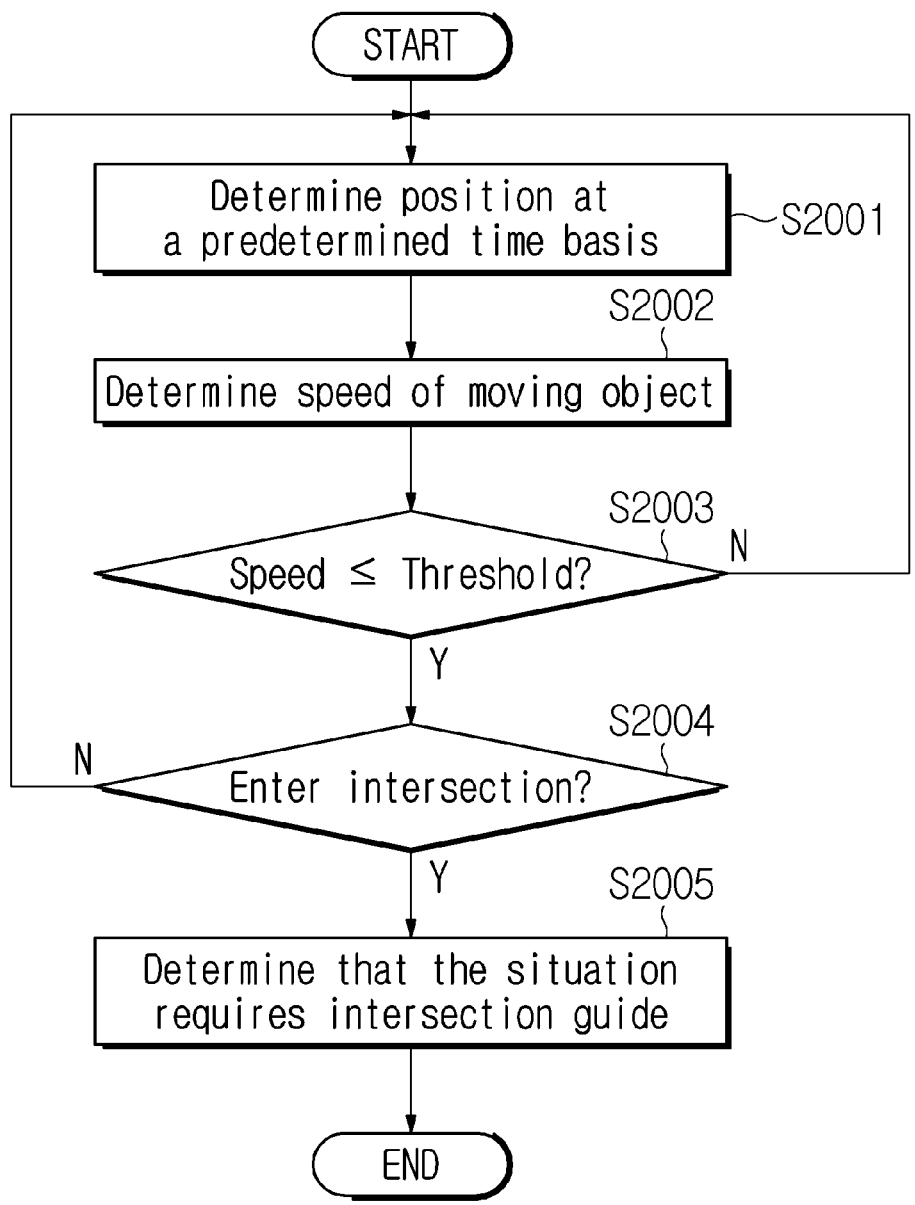
FIG. 20A is an illustration of a method of determining a situation requiring generation of a driving guideline.
Figure 21:
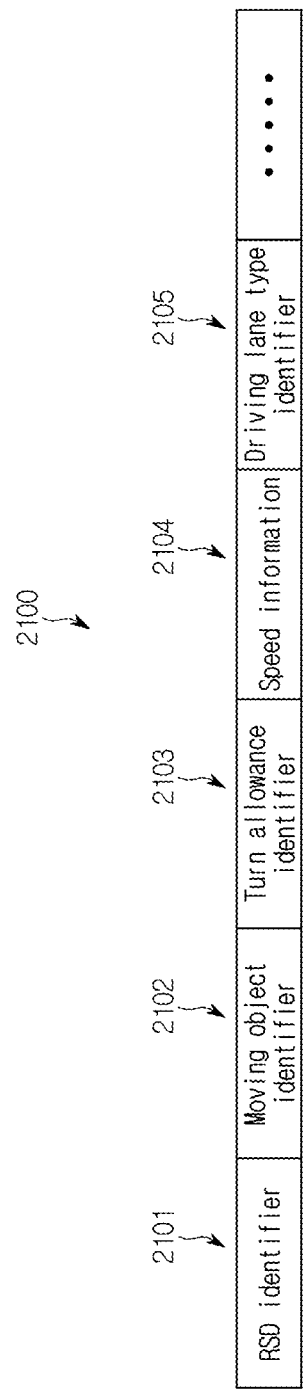
FIG. 21 is a view exemplarily illustrating data structure of RSD information used for determining a situation requiring generation of a guideline.

FIG. 20A is an illustration of a method by which a moving object determines a situation requiring generation of a guideline.

First, a moving object may be provided with a navigation system which is connected to a satellite navigation system like GPS and GLONASS. In such an environment, the moving object may identify its position on a predetermined time basis by being connected to a satellite navigation system and may display the position thus identified through the navigation system together with a map (S2001). Herein, the navigation system may determine a speed of the moving object based on the identified position on the predetermined time basis and may provide the speed (S2002). Herein, the position on the map and the speed identified in the steps S2001 and S2002 may be provided to the moving object. When making a turn or driving after entering an intersection, a moving object moves at a lower speed than predetermined for stable travel or driving of the moving object. Based on what is described above, the moving object may check whether or not the identified speed indicates a value relatively smaller than a predetermined threshold (S2003). When the identified speed indicates a value relatively smaller than the predetermined threshold (YES: S2003), since the possibility of turn or driving at an intersection is high, the moving object may identify a position provided by the navigation system and check whether or not it has entered the intersection (S2004). Herein, when the position thus identified shows that the moving object has entered the intersection, the moving object may determine that the situation requires an intersection guide (S2005).

Moreover, a moving object may be further provided with a black box system for capturing and recording surrounding situations. As a position provided by a navigation system could not be accurately detected due to a shadow region, a moving object may identify whether or not it enters an intersection by use of an image which is stored in real time through a black box system. For example, a moving object may recognize a traffic light, a traffic sign, a road surface marking, etc. from an image and may determine whether or not to enter an intersection by use of the traffic light, traffic sign, road surface marking, etc. Thus recognized.

Figure 20B:
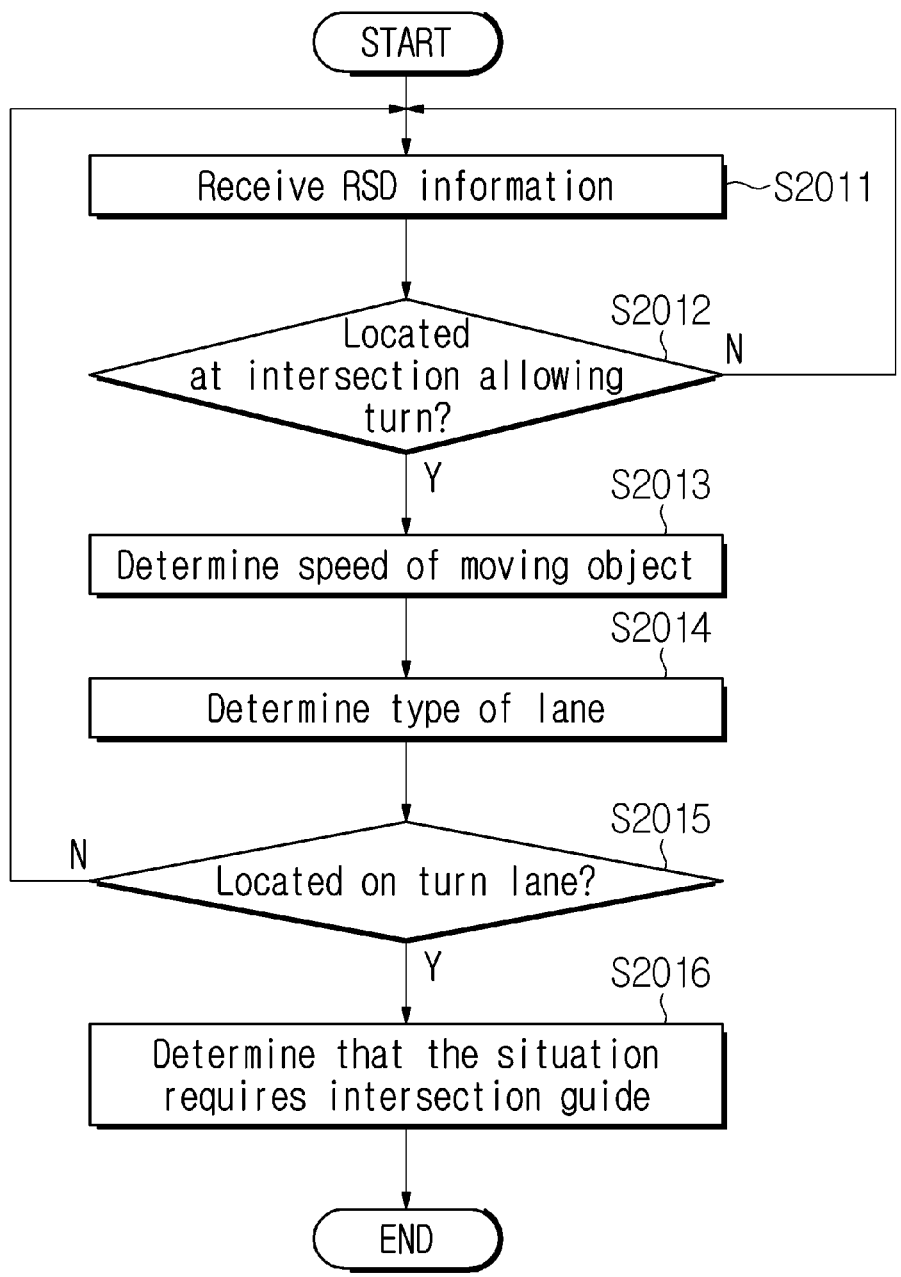
FIG. 20B is another illustration of a method of determining a situation requiring generation of a driving guideline.

FIG. 20B is another illustration of a method by which a moving object determines a situation requiring generation of a guideline.

Referring to FIG. 20B, a moving object may receive RSD information from a remote sensing device (RSD) (S2011). For example, the RSD may be a device which is provided at an intersection and provides information collected by it. Furthermore, being connected to a server apparatus of managing an intelligent transportation system (ITS) via a predetermined communication, the RSD may provide RSD information, and the server apparatus of managing the ITS may provide the RSD information to the moving object. As various exemplary embodiments of the present invention, the RSD may provide the RSD information to the moving object via a wireless local area network (LAN).

Furthermore, RSD information may include an RSD identifier 2101, a moving object identifier 2102, a turn allowance identifier 2103 for indicating whether or not an area with RSD allows a turn (left turn, right turn and U-turn), moving object speed information 2104 for indicating a speed of a moving object, and a lane type identifier 2105 for indicating a type of a lane (straight lane, left turn lane, U-turn lane, right turn lane, etc.) on which a moving object is located.

Next, a moving object may check whether or not the moving object is located at an intersection where a turn is allowed by determining a value carried by the turn allowance identifier 2103 in the above-described RSD information (S2012). Furthermore, the moving object may determine a value of the moving object speed information 2104 (S2103), determine the lane type identifier 2105 and thus determine whether or not a type of a lane on which the moving object is driving (S2104). Herein, when the value of the lane type identifier 2105 is a lane indicating a turn (YES: S2105), the moving object may determine that the situation requires an intersection guide (S2016).

Meanwhile, as described in FIG. 3, a guiding line for the driving of a moving object may be basically provided or not provided to a road, especially to an intersection zone. Hereinafter, based on whether or not a guiding line is provided on road, a method of operating the movement of a moving object at an intersection will be described.

Figure 22:
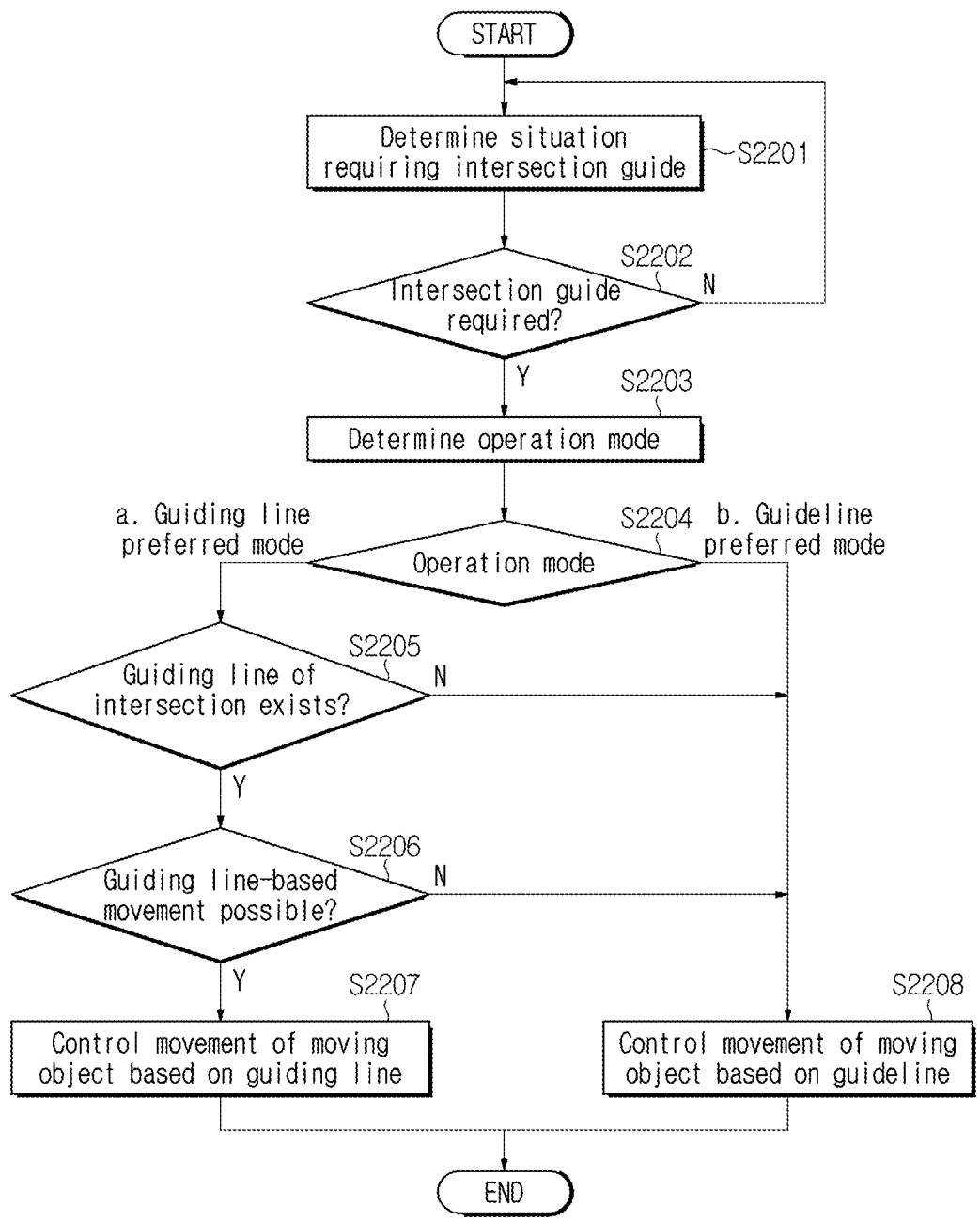
FIG. 22 is a view exemplarily illustrating a method of controlling a movement of a moving object based on whether or not there is an intersection guiding line, according to various exemplary embodiments of the present invention.

FIG. 22 is a view exemplarily illustrating a method of controlling a movement of a moving object based on whether or not there is an intersection guiding line, according to various exemplary embodiments of the present invention.

First, a moving object may identify a situation that requires an intersection guide (S2201). For example, as described above, the moving object may determine a situation requiring an entry into an intersection or an intersection guide through signal indication recognition using a camera sensor, signal indication recognition using a V2X communication, lane recognition based on IoT, lane recognition based on a communication with a RSE or a neighbor moving object, lane recognition based on a high definition map of LDM, and a speed of the moving object.

When it is determined that the situation requires an intersection guide (YES: S2202), the moving object may determine an operation mode (S2203). For example, an operation mode may include a guiding line preferred mode or a guideline preferred mode and may be determined based on a user's setting. As various exemplary embodiments of the present invention, an operation mode may be determined by at least one combination of factors (e.g., a road condition, a speed of moving object, a condition of intersection, a degree of congestion of intersection, a group of moving object, a type of moving object, etc.). As yet another example, an operation mode may be determined by a user's setting and at least one combination of factors.

When the operation mode is a guiding line preferred mode (A: S2204), the moving object may check whether or not there is a guiding line at an intersection (S2205). Herein, the moving object may determine whether or not there is a guiding line by analyzing an image which is input through a camera sensor. As various exemplary embodiments of the present invention, the moving object may determine whether or not there is a guiding line based on information provided by a high definition map. When there is a guiding line, the step S2206 may be implemented. When there is no guiding line, the step S2208 may be implemented.

Meanwhile, there may be a single turn lane or a plurality of turn lanes. When there is a single turn lane, a moving object is not affected by another moving object which is making a turn on a neighbor turn lane. However, when there is a plurality of turn lanes, a moving object may be affected by another moving object which is making a turn on a neighbor turn lane. Based on this, a moving object may check a situation of an intersection and determine whether or not the moving object is capable of move based on a guiding line (S2206). For example, a moving object may check whether there is a single turn lane or there is a plurality of turn lanes. When there is a single turn lane, the moving object may determine that it may move based on a guiding line. As various exemplary embodiments of the present invention, when there is a plurality of turn lanes, the moving object may check whether or not there is another moving object which is making a turn on a neighbor turn lane. When there is no moving object which is making a turn on the neighbor turn lane, it may be determined that the moving object may move based on a guiding line. Furthermore, even when there is another moving object which is making a turn on a neighbor turn lane, the moving object may not be affected while making a turn on a turn lane, depending on a type of moving object. With this being considered, the moving object may check a size of another moving object or a type of the another moving object which is making a turn on a neighbor turn lane and may determine whether or not the movement of the moving object based on a guiding line is possible by considering the size or type of the another moving object thus checked.

Although, in various exemplary embodiments of the present invention, an operation of checking whether or not the movement of a moving object based on a guiding line is possible is illustrated, the present invention is not limited thereto and the exemplary embodiment may be modified in various ways by considering factors like a degree of congestion of intersection, a road surface condition, a weight of a moving object, and a speed of a moving object.

When it is determined that the moving object may move based on a guiding line (Y: S2206), the moving object may determine a control of movement based on the guiding line (S2207). On the other hand, when it is determined that the moving object is incapable of moving based on the guiding line (N: S2206), the moving object may implement the step S2208.

In the step S2208, the moving object may determine a control of the moving object based on a guideline. As described in FIGS. 4 to 19, the moving object may configure the guideline and control the movement of the moving object based on the guideline thus configured.

Figure 23:
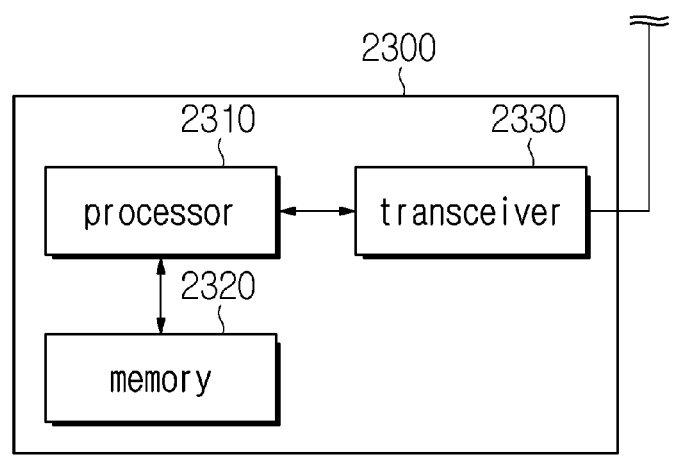
FIG. 23 is a view exemplarily illustrating an apparatus configuration according to various exemplary embodiments of the present invention.

FIG. 23 is a view exemplarily illustrating an apparatus configuration according to various exemplary embodiments of the present invention.

Referring to FIG. 23, an apparatus may include at least one or more among the above-described moving object, a device, a server and an RSU. In other words, an apparatus may communicate and work with another device, which is not limited to the above-described embodiment. For example, for the above-described operation, an apparatus 2300 may include at least one of a processor 2310, a memory 2320, and a transceiver 2330. In other words, an apparatus may include a necessary configuration for communicating with another apparatus. Furthermore, for example, an apparatus may include another configuration apart from the above-described configuration. In other words, an apparatus may have a configuration, which includes the above-described apparatus of communicating with another device but is not limited thereto, and may be operated based on what is described above.

Although the exemplary methods of the present invention described above are represented by a series of acts for clarity of explanation, they are not intended to limit the order in which the steps are performed, and if necessary, each step may be performed simultaneously or in a different order. To implement a method according to various exemplary embodiments of the present invention, the illustrative steps may include an additional step or exclude some steps while including the remaining steps. Alternatively, some steps may be excluded while additional steps are included.

The various embodiments of the present invention are not intended to be all-inclusive and are intended to illustrate representative aspects of the present invention, and the features described in the various embodiments may be applied independently or in a combination of two or more.

Furthermore, the various embodiments of the present invention may be implemented by hardware, firmware, software, or a combination thereof. In the case of hardware implementation, one or more application specific integrated circuits (ASICs), digital signal processors (DSPs), digital signal processing devices (DSPDs), programmable logic devices (PLDs), field programmable gate arrays, a general processor, a controller, a microcontroller, a microprocessor, and the like may be used for implementation.

The scope of the present invention includes software or machine-executable instructions (for example, an operating system, applications, firmware, programs, etc.) that enable operations according to the methods of various embodiments to be performed on a device or computer, and a non-transitory computer-readable medium in which such software or instructions are stored and are executable on a device or computer. The one or more application specific integrated circuits (ASICs), the digital signal processor (DSP), the digital signal processing device (DSPD), the programmable logic device (PLD), the field programmable gate array, the processor, the controller, the microcontroller, or the microprocessor may be configured to execute the software or machine-executable instructions to perform the above-described operations to control the display device, the airbag module, and/or other elements.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A method of providing a driving guideline in a moving object, the method comprising:
    triggering a driving guideline provision instruction in the moving object;
    generating, by a processor in the moving object, the driving guideline according to the implemented triggering;
    outputting, by the processor of the moving object, the generated driving guideline; and
    driving the moving object, by the processor of the moving object, according to the generated driving guideline,
    wherein, when the driving guideline is generated, the processor of the moving object is configured to exchange information on the generated driving guideline with at least one preset moving object and is configured to determine a collision possibility thereof according to the exchanged information on the generated driving guideline,
    wherein, when the processor of the moving object detects at least one moving object with the collision possibility according to the exchanged information on the driving guideline, the processor of the moving object is configured to determine a priority order of driving with the at least one detected moving object,
    wherein the processor of the moving object is configured to determine whether the moving object and the at least one detected moving object with the collision possibility are in line with one another,
    wherein, when the moving object and the at least one detected moving object with the collision possibility are in line with one another, the processor of the moving object is configured to compare sizes with the at least one detected moving object with the collision possibility, and
    wherein the priority order of the driving is provided to one moving object with a larger size among the moving object and the at least one detected moving object.

2. The method of claim 1, wherein the driving guideline provision instruction is triggered, when a turn signal light of the moving object is turned on.

3. The method of claim 1, wherein the triggering of the driving guideline provision instruction includes:
    recognizing a turn of the moving object; and
    triggering the driving guideline provision instruction corresponding to the recognizing of the turn of the moving object.

4. The method of claim 1,
    wherein the processor of the moving object is configured to determine at least one of a first lane information at a point in which a turn of the moving object starts and a second lane information related to a road for the moving object to enter according to the turn, and
    wherein the driving guideline is generated according to the at least one of the first lane information and the second lane information.

5. The method of claim 1,
    wherein the processor of the moving object is configured to determine whether the moving object enters an intersection according to position information, and
    wherein the driving guideline is generated according to whether the moving object enters the intersection.

6. The method of claim 5,
    wherein the processor of the moving object is configured to recognize at least one of a traffic light, a traffic sign, a road surface marking, from an image which is taken around the moving object in real time, and
    wherein the driving guideline is generated according to at least one of the recognized traffic light, the recognized traffic sign, and the recognized road surface marking.

7. The method of claim 1,
    wherein the processor of the moving object is configured to receive Remote Sensing Device (RSD) information from an RSD, and
    wherein the driving guideline is generated according to the RSD information.

8. The method of claim 7,
    wherein the RSD information includes at least one of an RSD identifier, a moving object identifier, a turn allowance identifier for indicating whether an area provided in the RSD allows a turn of a vehicle, speed information related to the moving object for indicating a speed of the moving object, and a driving lane type identifier for indicating a type of a driving lane located on the moving object.

9. The method of claim 4,
    wherein the driving guideline is generated by further considering at least one of a length of the moving object, a width of the moving object, a road width, a road length, a number of lanes, and a road surface condition.

10. The method of claim 1,
wherein, when the moving object determines the collision possibility, the processor of the moving object is configured to provide an alarm to a user of the moving object.

11. The method of claim 1,
wherein, when the moving object and the at least one detected moving object with the collision possibility are not in line with one another,
the priority order of the driving is provided to one moving object which is located relatively in front, among the moving object and the at least one detected moving object.

12. The method of claim 1, further includes determining a moving object group according to the sizes of the moving object and the at least one detected moving object,
wherein, when the moving object groups are a same, the priority order of the driving is randomly determined.

13. The method of claim 12,
wherein the processor of the moving object is configured to output information on the collision possibility and the priority order of the driving with the generated driving guideline.

14. The method of claim 12,
wherein, when the moving object is an autonomous vehicle, the processor of the moving object autonomously drives the moving object along the generated driving guideline according to the priority order of the driving.

15. The method of claim 1, further includes obtaining, by the processor of the moving object, position information related to the moving object and information on a surrounding situation of the moving object,
wherein the processor of the moving object is configured to generate the driving guideline by further considering the position information related to the moving object and the information on the surrounding situation.

16. A moving object configured for providing a driving guideline, the moving object comprising:
a transceiver configured for transmitting and receiving a signal; and
a processor engaged to the transceiver and configured for controlling the transceiver, wherein, the processor is configured to:
trigger a driving guideline provision instruction, and generate the driving guideline according to the triggering,
output the generated driving guideline, and
drive the moving object according to the generated driving guideline, and
wherein, when the driving guideline is generated, the processor of the moving object is configured to exchange information on the generated driving guideline with at least one preset moving object and is configured to determine a collision possibility thereof according to the exchanged information on the generated driving guideline,
wherein, when the processor detects at least one moving object with the collision possibility according to the exchanged information on the driving guideline, the processor of the moving object is configured to determine a priority order of driving with the at least one detected moving object,
wherein the processor is configured to determine whether the moving object and the at least one detected moving object with the collision possibility are in line with one another,
wherein, when the moving object and the at least one detected moving object with the collision possibility are in line with one another, the processor of the moving object is configured to compare sizes with the at least one detected moving object with the collision possibility, and
wherein the priority order of the driving is provided to one moving object with a larger size among the moving object and the at least one detected moving object.

17. A moving object configured for providing a driving guideline, the moving object comprising:
a transceiver configured for transmitting and receiving a signal; and
a processor engaged to the transceiver and configured for controlling the transceiver, wherein, the processor is configured to:
sense a turn situation, generate the driving guideline of the moving object according to the sensing of the turn situation, and
drive the moving object according to the generated driving guideline, and
wherein, when the driving guideline is generated, the processor of the moving object is configured to exchange information on the generated driving guideline with at least one preset moving object and is configured to determine a collision possibility thereof according to the exchanged information on the generated driving guideline,
wherein, when the processor detects at least one moving object with the collision possibility according to the exchanged information on the driving guideline, the processor of the moving object is configured to determine a priority order of driving with the at least one detected moving object,
wherein the processor is configured to determine whether the moving object and the at least one moving object with the collision possibility are in line with one another,
wherein, when the moving object and the at least one detected moving object with the collision possibility are in line with one another, the processor of the moving object is configured to compare sizes with the at least one detected moving object with the collision possibility, and
wherein the priority order of the driving is provided to one moving object with a larger size among the moving object and the at least one detected moving object.

* * * * *